(12) United States Patent
Inoue et al.

(10) Patent No.: US 6,341,825 B1
(45) Date of Patent: Jan. 29, 2002

(54) WHEEL CAP

(75) Inventors: Tomokazu Inoue, Nagoya; Takahiro Komori, Inazawa, both of (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/347,860

(22) Filed: Jul. 9, 1999

(30) Foreign Application Priority Data

Jul. 9, 1998 (JP) .......................................... 10-194085
Jul. 14, 1998 (JP) .......................................... 10-198853

(51) Int. Cl.$^7$ .......................... B60B 19/10; B60B 7/00; F16D 65/78
(52) U.S. Cl. ................... 301/6.3; 301/37.1; 188/264 A; 188/264 AA
(58) Field of Search ................................ 301/6.3, 37.1; 188/218 A, 264 A, 264 AA

(56) References Cited

U.S. PATENT DOCUMENTS

| | | | | |
|---|---|---|---|---|
| 2,687,192 A | * | 4/1954 | Butterfield | 301/6.3 |
| 2,740,502 A | * | 4/1956 | Butterfield | 301/37.1 |
| 2,857,022 A | * | 10/1958 | Lyon | 301/6.3 |
| 2,870,879 A | * | 1/1959 | Gaylord et al. | 301/6.3 |
| 2,973,836 A | * | 3/1961 | Klaue | 301/6.3 |
| 2,992,708 A | * | 7/1961 | Lyon | 301/6.3 |
| 4,219,241 A | * | 8/1980 | Muller et al. | 301/6.3 |
| 4,503,944 A | * | 3/1985 | Burckhardt et al. | 188/264 |

FOREIGN PATENT DOCUMENTS

DE 3152498 * 6/1983 .................. 301/6.3

* cited by examiner

Primary Examiner—S. Joseph Morano
Assistant Examiner—Jason R. Bellinger
(74) Attorney, Agent, or Firm—Pillsbury Winthrop LLP Intellectual Property

(57) ABSTRACT

A wheel cap is detachably joined to a disc wheel and having air discharge openings formed in the outer periphery thereof. The wheel cap has a plurality of radial fins provided for the reverse side of the wheel cap and formed from the wheel cap center toward the outside. Further, the wheel cap has an annular air suction opening, and a center plate disposed more adjacent to the center thereof as compared with the air suction opening. The inner distance between the innermost wall of the air suction opening and the center of the wheel cap is shorter than securing distance between a hub nut for securing the disc wheel to an axle hub and the center of the disc wheel.

11 Claims, 20 Drawing Sheets

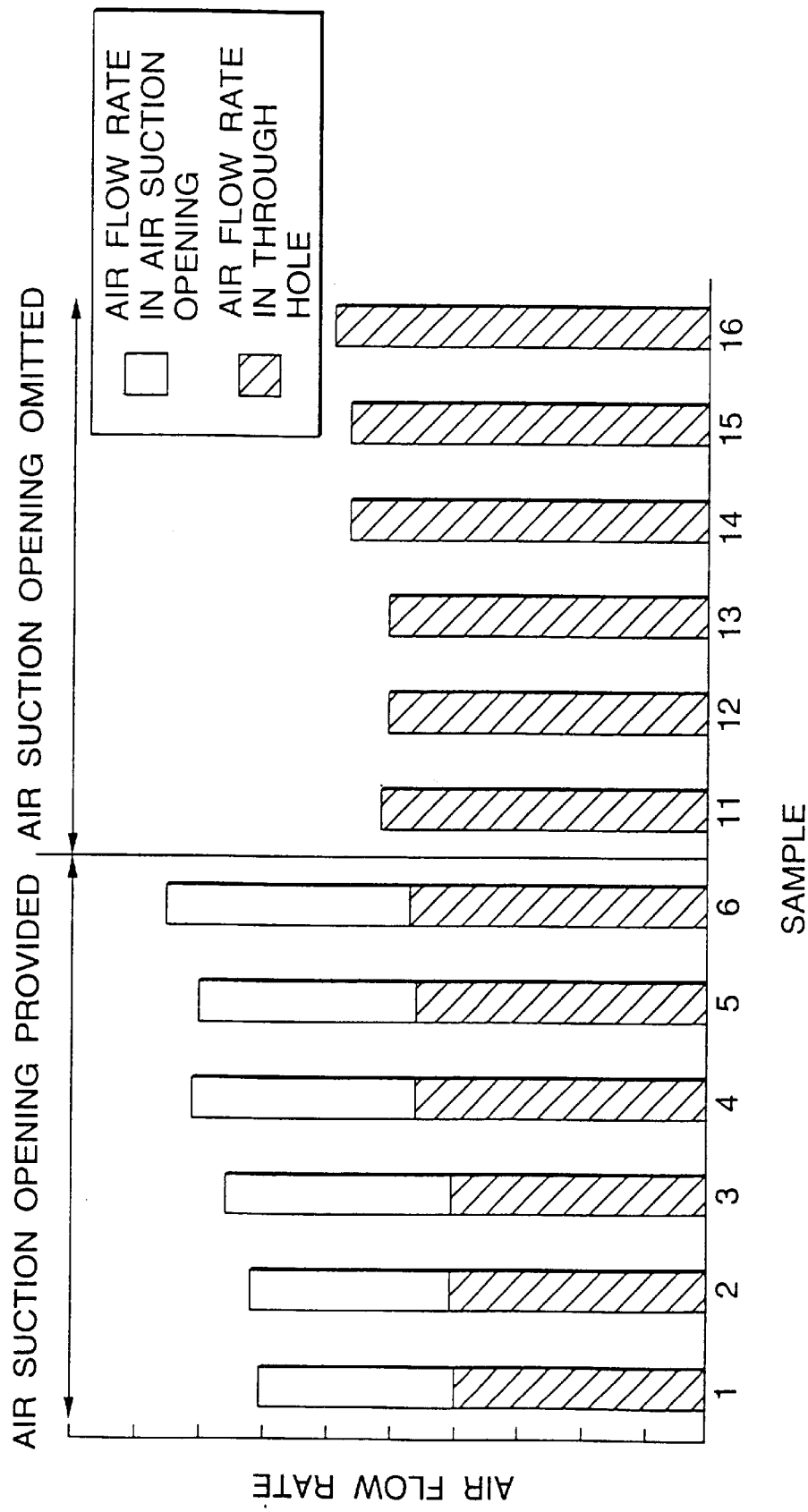

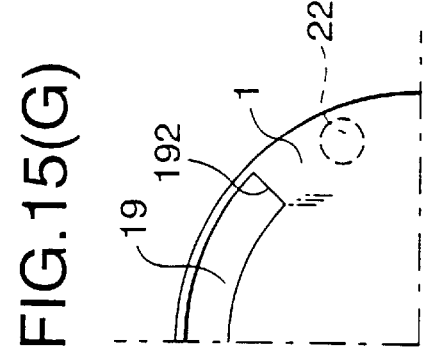
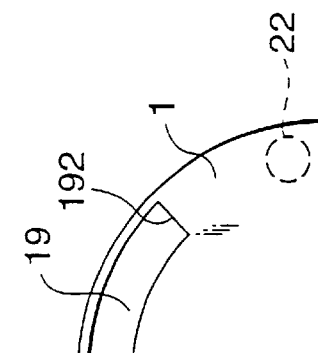
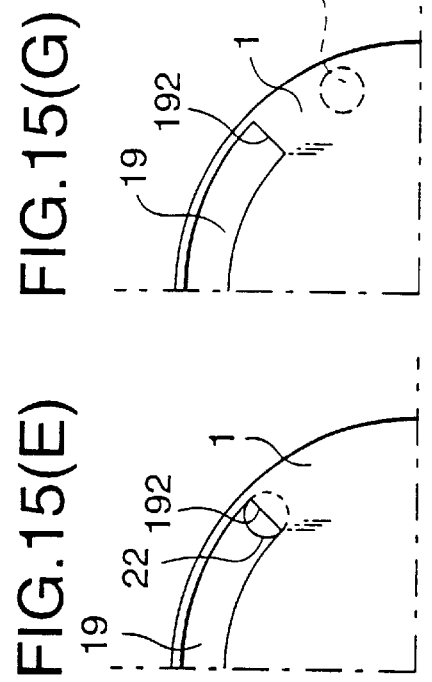
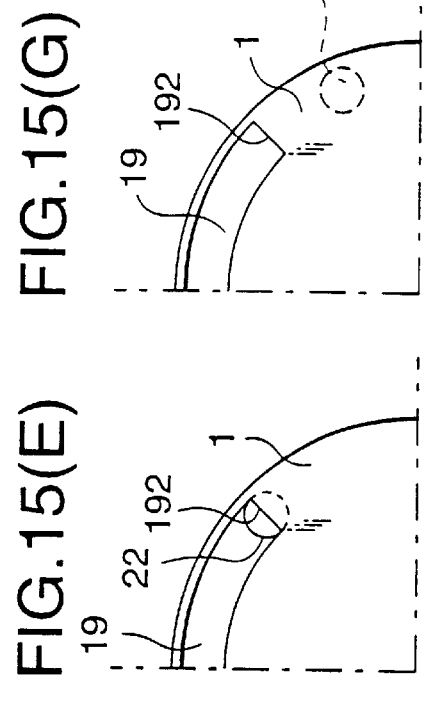
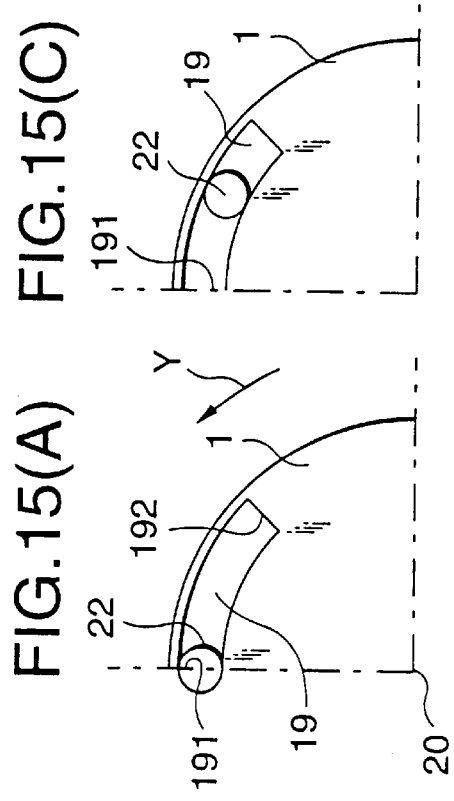
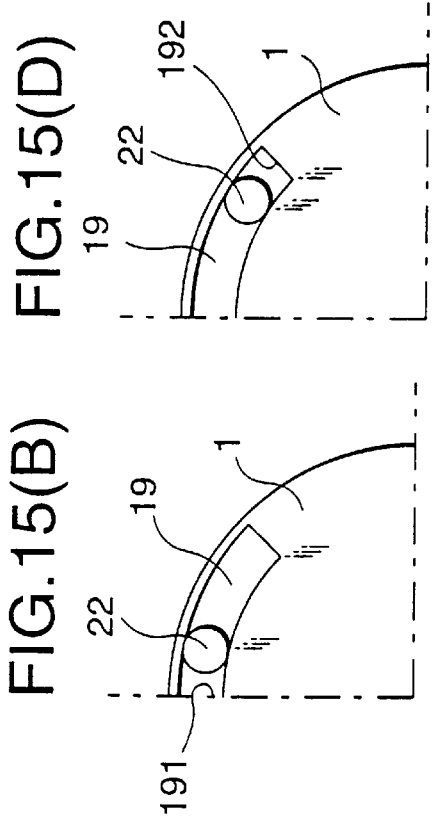

PRIOR ART

WHEEL CAP

The present application is based on Japanese Patent Applications No. Hei. 10-194085 and 10-198853, which are incorporated herein by reference.

BACKGROUND OF THE INVENTION

1. Field of the Invention

The present invention relates to a wheel cap which is capable of preventing rise in temperatures of a brake pad, a disc wheel, a wheel cap and so forth.

2. Description of the Related Art

A conventional wheel cap having air discharge openings 99 formed in the outer periphery thereof is shown in FIG. 20.

After the wheel cap 9 has been joined to the disc wheel 2, outside air is allowed to flow from the inside portion of the disc wheel 2 to the air discharge openings 99. Thus, rise in the temperature of a brake pad caused from the operation of a brake unit is prevented so that wear of the brake pad 31 is reduced.

However, the conventional wheel cap 9 has the following problems.

As shown in FIG. 20, the wheel cap 9 is not provided with any openings in a region between the hub nut 21 and the center of wheel cap 9.

That is, the air discharge openings 99 are formed further out than the hub nut 21 of the disc wheel 2.

Therefore, airflow 4 occurring after the wheel cap 9 has been joined to the disc wheel 2 do not substantially pass through the hub nut 21.

That is, when the wheel cap 9 has been joined as described above, air 4 is sucked from the inside portion of the disc wheel 2 as indicated with an arrow shown in FIG. 20. Then, air 4 is allowed to pass through holes 22 provided for the disc wheel 2, and then discharged to the outside through the air discharge openings 99 formed in the periphery of the wheel cap 9.

As described above, a major portion of air 4 is allowed to pass through the outer portion of a brake disc 32, the disc wheel 2 and the wheel cap 9. That is, air 4 is not allowed to pass through the central portion including the hub nut 21 and the axle hub 33 when air 4 is discharged to the outside.

Therefore, the central portion of each of the brake disc 32, the disc wheel 2 and the axle hub 33 is not sufficiently cooled down. Also the hub nut 21 is not cooled down sufficiently.

As a result, the temperatures of the central portions of the brake disc 32, the axle hub 33 and the disc wheel 2 are raised. Further, an interior space 5 between the wheel cap 9 and the disc wheel 2 is narrow and no forcible air discharge means is provided therein, as shown in FIG. 20. Therefore, even if a small amount of air 4 is introduced into the interior space 5, circulation of air 4 sucked into the interior space 5 through the through holes 22 cannot smoothly be performed. Thus, stagnation of air 4 easily occurs in the interior space 5.

Therefore, the axle hub 33, the hub nut 21, the disc wheel 2, the wheel cap 9 and so forth cannot sufficiently be cooled down. Therefore, there is a possibility that the rise in the temperatures cannot be prevented.

The rise in the temperature of the disc wheel 2 is caused from conduction of heat of the brake disc 32 through the axle hub 33 and the hub nut 21.

Therefore, the rise in the temperature of the hub nut 21 causes the temperatures of the disc wheel 2 and the wheel cap 9 joined to the disc wheel 2 to be raised. As a result, there is a possibility that the brake pad is quickly worn and the wheel cap is deformed.

If the hub nut 21 is not cooled down sufficiently, the rise in the temperatures of the disc wheel 2 and the wheel cap 9 cannot easily be prevented.

SUMMARY OF THE INVENTION

In view of the foregoing, an object of the present invention is to provide a wheel cap which is capable of preventing rise in the temperatures of the disc wheel, the wheel cap and so forth after the wheel cap has been joined to the disc wheel.

According to one aspect of the present invention, there is provided a wheel cap detachably joined to a disc wheel and having air discharge openings formed in the outer periphery thereof, the wheel cap comprising: a plurality of radial fins provided for the reverse side of the wheel cap and formed from the wheel cap center toward the outside.

An essential portion of the present invention is the structure that the plural radial fins are provided for the reverse side of the wheel cap and formed from the wheel cap center toward the outside.

The operation and effect of the present invention will now be described.

As described above, the plural fins are provided for the reverse side of the wheel cap. As a result, centrifugal force is imparted to air sucked into the interior space between the wheel cap and the disc wheel owning to rotations of the wheel. Thus, air is sent to the air discharge openings formed at the outer periphery of the wheel cap along the fins.

That is, the centrifugal force is generated when air is rotated as a result of rotations of the wheel. Since the fins are provided for the reverse side of the wheel cap as described above, air can efficiently be rotated. Thus, great centrifugal force is imparted to air.

As a result, air in the interior space can efficiently be sent to the air discharge openings.

Therefore, the quantity of air which is circulated in the interior space can be enlarged. As a result, the efficiency of cooling the disc wheel and so forth can be improved.

As described above, according to the present invention, a wheel cap can be obtained which is able to prevent a rise in the temperatures of the disc wheel, the wheel cap and so forth after the wheel cap has been joined to the disc wheel.

It is preferable that the plural fins are formed from the wheel cap center to the outer end of the wheel cap.

As a result, air existing from the wheel cap center to the outer periphery of the wheel cap can be rotated when the wheel has been rotated. Therefore, greater centrifugal force can be imparted.

Therefore, the quantity of air which is circulated in the interior space can furthermore be enlarged. Thus, the efficiency of cooling the disc wheel can furthermore be improved.

It is preferable that when an assumption is made that the radius of the wheel cap is R, the plural fins are formed on straight lines, which connect the wheel cap center and the outer end of the wheel cap to each other, in regions from about R/2 from the wheel cap center to the outer end of the wheel cap. As a result, the quantity of air which is circulated in the interior space can be increased(refer to experiment 1). Moreover, a wheel cap having a reduced weight can be obtained.

It is preferable that when an assumption is made that the radius of the wheel cap is R, the plural fins are formed on straight lines which connect the wheel cap center and the outer end of the wheel cap to each other, in regions from positions of distance 3R/4 from the wheel cap center to the outer end of the wheel cap.

As a result, the quantity of air which is circulated in the interior space can be increased(refer to experiment 1). Moreover, a wheel cap having an even more reduced weight can be obtained.

It is preferable that when an assumption is made that the radius of the wheel cap is R, the plural fins are formed on straight lines which connect the wheel cap center and the outer end of the wheel cap to each other in regions from positions about R/2 from the wheel cap center to positions about 3R/4.

As a result, a wheel cap having a small weight can be obtained.

It is preferable that the number of the fins provided for the wheel cap is 20 to 30.

As a result, air in the interior space between the wheel cap and the disc wheel can be efficiently rotated. Therefore, the quantity of air which is circulated in the interior space can be increased (refer to experiment 2).

If the number of the fins is smaller than 20, the effects of the fins may not sufficiently increase the quantity of air which is circulated in the interior space. If the number of the fins is larger than 30, the effect required to improve the air circulation by enlarging the number of the fins becomes unsatisfactory. Thus, there arises a problem in that the weight of the wheel cap is enlarged.

Therefore, according to the present invention, a wheel cap exhibiting an excellent efficiency of cooling the disc wheel can be obtained.

It is preferable that when the radius of the wheel cap is R, the plural fins are formed along the radius except for a portion adjacent to the wheel cap center in which the distance from the wheel cap center is R/20 to R/10 and an outer portion in which the distance from the wheel cap center is 9R/10 to 19R/20 (see FIG. 3).

As a result, a wheel cap can be obtained which is capable of increasing the quantity of air which is circulated in the interior space, which can easily be manufactured and which can easily be joined to the disc wheel can be obtained.

It is preferable that the wheel cap has an annular air suction opening and a center plate disposed closer to the center of the wheel cap than the air suction opening, and inner distance C between the innermost wall of the air suction opening and the wheel cap center is shorter than securing distance D between a securing position at which the disc wheel is secured to an axle and the disc wheel center (see FIG. 2).

After the wheel cap has been joined to the disc wheel, the air suction opening is positioned closer to the disc wheel center than the securing position. Therefore, air is introduced into the interior space from the position closer to the disc wheel center than with the securing position, and then discharged through the air discharge openings (see FIG. 2).

Therefore, air is allowed to pass through the centers of the hub nut at the securing position, the brake disc, the axle hub and the disc wheel. Thus, the foregoing elements can sufficiently be cooled down.

As a result, a rise in the temperatures of the central portions of the brake disc, the axle hub and the disc wheel can be prevented.

Since the hub nut and so forth can sufficiently be cooled down, conduction of heat from the brake disc and the axle hub to the disc wheel can be prevented. As a result, rise in the temperatures of the disc wheel and the wheel cap joined to the disc wheel can be prevented.

According to another aspect of the present invention, there is provided a wheel cap detachably joined to a disc wheel and having air discharge openings formed in the outer periphery thereof, the wheel cap comprising: an annular air suction opening; and a center plate disposed more adjacent to the center thereof as compared with the air suction opening, wherein inner distance A between the innermost wall of the air suction opening and the center of the wheel cap is shorter than the securing distance D between a securing position at which the disc wheel is secured to an axle hub and the center of the disc wheel.

An essential portion of the present invention is a structure in which the inner distance A between the innermost wall of the air suction opening and the center of the wheel cap is shorter than securing distance D between a securing position at which the disc wheel is secured to an axle hub and the center of the disc wheel (see FIG. 9).

The operation and effect of the foregoing aspect will now be described.

After the wheel cap has been joined to the disc wheel, the air suction opening is formed at a position closer to the center of the disc wheel than the securing position. Therefore, air is introduced into a space between the disc wheel and the wheel cap through a position closer to the center of the disc wheel than the securing position. Then, air is discharged through the air discharge openings (as indicated with an arrow shown in FIG. 7).

Therefore, air is allowed to pass through the securing position, the center portions of the brake disc, the axle hub and the disc wheel.

As a result, the center portions of the brake disc, the axle hub and the disc wheel and the hub nut secured to the securing position can sufficiently be cooled down.

Moreover, a rise in the temperatures of the center portions of the brake disc, axle hub and the disc wheel can be prevented.

Since the hub nuts and so forth can sufficiently be cooled down, heat conduction from the brake disc and the axle hub to the disc wheel can be prevented. As a result, rise in the temperature of the disc wheel and the wheel cap joined to the disc wheel can be prevented.

As a result, according to the present invention, a wheel cap can be obtained which is able to prevent rise in the temperatures of the brake pad, the disc wheel and the wheel cap after the wheel cap has been joined to the disc wheel.

It is preferable that a distance B between the outermost wall of the air suction opening and the center of the wheel cap is shorter than the securing distance D (see FIG. 9).

As a result, air sucked through the air suction opening is efficiently allowed to pass through the hub nut and so forth. Thus, the hub nut and so forth can efficiently be cooled down.

After the wheel cap has been joined to the disc wheel, the hub nut and so forth cannot be seen. Thus, the quality of the design can be improved.

It is preferable that the center plate is disposed to retract to the reverse side of the wheel cap.

Note that the "reverse side" is a side on which the wheel cap is joined to the disc wheel.

As a result, the quantity of air which is sucked through the air suction opening can be enlarged so that the efficiency of cooling the disc wheel and so forth is furthermore improved.

It is preferable that the center plate projects over the right side of the wheel cap.

Note that the "right side" is the side opposite to the foregoing reverse side.

The efficiency of cooling the disc wheel and so forth can furthermore be improved.

It is preferable that the reverse side of the wheel cap has a plurality of fins formed radially from the center of the reverse side of the wheel cap toward the outside.

As a result, centrifugal force generated because of rotations of the wheel is imparted to air sucked through the air suction opening. As a result, air is moved to the air discharge openings formed in the outer periphery of the wheel cap, along the fins.

That is, the centrifugal force is generated when air is rotated owning to rotations of the wheel. When the fins are provided for the reverse side of the wheel cap as described above, air can efficiently be rotated. As a result, greater centrifugal force is imparted to air.

Therefore, air can efficiently be moved to the air discharge opening.

As a result, an amount of air which is circulated in the wheel cap can be increased so that the efficiency of cooling the disc wheel and so forth is furthermore improved.

According to yet another aspect of the present invention, there is provided a wheel cap detachably joined to a disc wheel, comprising: air discharge openings formed in the outer periphery thereof, wherein the air discharge openings of the wheel cap are openings opened toward outside.

That is, each air discharge opening is formed in a cut-out shape. After the wheel cap has been joined to the disc wheel, a gap is formed between each air discharge opening in the form of the cut-out shape and the end of the disc wheel.

The operation and effect of the present invention will now be described.

The wheel cap has air discharge openings in the outermost portion thereof. Therefore, air sucked into the space between the wheel cap and the disc wheel is discharged through the outermost portion of the wheel cap.

Therefore, an excellent air discharge characteristic can be produced. Moreover, the overall body of the disc wheel and so forth can be cooled down efficiently.

Each air discharge opening is formed into the cut-out shape formed in the outer end of the wheel cap, that is, the air discharge opening is not formed into a through hole. Therefore, portions of resin for molding are not in contact with each other in the outer portion when the wheel cap is molded.

Therefore, formation of stripes can be prevented as often occurs in the outer portion of the conventional wheel cap. As a result, the quality of the appearance does not deteriorate.

Since the wheel cap has the outer end in the form of the cut-out shape, a gap is formed from the end of the disc wheel in a state in which the wheel cap has been joined to the disc wheel.

Therefore, the wheel cap can be easily removed from the disc wheel by inserting a tool or the like into the gap.

Each of the air discharge openings is formed into the cut-out shape facing the outside. Therefore, when dust or the like of the brake pad is, together with air, discharged through the air discharge openings, it does not adhere to the designed surface of the wheel cap.

Therefore, a wheel cap can be obtained which cannot easily be contaminated.

The foregoing wheel cap is not required to have an opening which is formed on the designed surface thereof. Therefore, the designed surface can be flattened. As a result, the operation for cleaning the wheel cap can easily be performed. Moreover, a satisfactory cd value can be obtained.

As described above, according to the present invention, a wheel cap can be obtained which is capable of preventing rise in the temperatures of the brake pad, the disc wheel and the wheel cap and which exhibits an excellent design quality.

According to still another aspect of the present invention, there is provided a wheel cap detachably joined to a disc wheel, comprising: air discharge openings formed in the outer periphery thereof, wherein discharge opening distance C between the innermost wall of each air discharge opening and the center of the wheel cap is longer than through-hole distance K between the outermost wall of each through hole provided for the disc wheel and the center of the disc wheel.

The operation and effect of the foregoing aspect will now be described.

After the wheel cap has been joined to the disc wheel, the air discharge openings are brought to the positions further out than the through holes of the disc wheel (see FIG. 7).

Air allowed to pass through the through holes from the inside portion of the disc wheel is discharged through the air discharge openings of the wheel cap. Since the air discharge openings are positioned further out than the through holes, centrifugal force generated as a result of rotations of the wheel and acting in the direction toward the air discharge openings is imparted to air allowed to pass through the through holes.

Therefore, the amount of air which is circulated in the wheel cap can be increased and, thus, the efficiency of cooling the disc wheel and so forth can be improved.

As described above, a wheel cap can be obtained which is able to efficiently cool the disc wheel and so forth after the wheel cap has been joined to the disc wheel.

According to still another aspect of the present invention, there is provided a wheel cap detachably joined to a disc wheel, comprising: air discharge openings formed in the outer periphery thereof, wherein the air discharge openings are formed on straight lines connecting the through holes provided for the disc wheel and the center of the disc wheel to one another.

The operation and effect of the present invention will now be described.

After the foregoing wheel cap has been joined to the disc wheel, air allowed to pass through the through holes from the inside portion of the disc wheel is discharged through the air discharge openings of the wheel cap. The air discharge openings are formed on the straight lines connecting the through holes and the center of the disc wheel to one another (as indicated with reference numerals 19 and 19A shown in FIG. 14). Therefore, air allowed to pass through the through holes can smoothly be discharged through the air discharge openings.

As a result, the amount of air which is circulated in the wheel cap can be enlarged. As a result, the efficiency of cooling the disc wheel and so forth can be improved.

As described above, according to the present invention, a wheel cap can be obtained which is capable of efficiently cooling the disc wheel and so forth after the wheel cap has been joined to the disc wheel.

According to still another aspect of the present invention, there is provided a wheel cap detachably joined to a disc wheel, comprising: air discharge openings formed in the outer periphery thereof, wherein the air discharge openings of the wheel cap do not incorporate a discharge opening fin projecting toward the reverse side of the wheel cap at least in the central portion of the wheel cap.

Note that the "discharge opening fin" is a projecting plate projecting over the reverse side of the wheel cap to surround the air discharge openings.

The operation and effect of the present invention will now be described.

After the wheel cap has been joined to the disc wheel, flows of air in the wheel cap are directed from the center of the disc wheel to the outside as a result of centrifugal force provided by the rotation of the disc wheel. Since no discharge opening fin is provided for the air discharge opening adjacent to the center of the wheel cap, the air flow is not obstructed. Therefore, air can be allowed to flow smoothly to the air discharge openings so as to be discharged to the outside.

Therefore, the amount of air which is circulated in the wheel cap can be enlarged so that the efficiency of cooling the disc wheel and so forth is improved.

As described above, according to the present invention, a wheel cap can be obtained which is able to efficiently cool the disc wheel and so forth after the wheel cap has been joined to the disc wheel.

It is preferable that the wheel cap has an annular air suction opening and a center plate disposed closer to the center thereof than the air suction opening, wherein inner distance A between the innermost wall of the air suction opening and the center of the wheel cap is shorter than the securing distance D between a securing position at which the disc wheel is secured to an axle hub and the center of the disc wheel.

As a result, thanks to similar operation and effect of the aspect of the present invention, rise in the temperatures of the brake pad, the disc wheel and the wheel cap can furthermore efficiently be prevented after the wheel cap has been joined to the disc wheel.

It is preferable that distance B between the outermost wall of the air suction opening and the center of the wheel cap is shorter than the securing distance D (see FIG. 9).

As a result, air sucked through the air suction opening is, similarly to the aspect of the present invention, efficiently allowed to pass through the hub nut and so forth. Thus, the hub nut and so forth can efficiently be cooled down.

Since the hub nut and so forth cannot be observed from outside after the wheel cap has been joined to the disc wheel, the design quality can be improved.

It is preferable that in one embodiment of the present invention the center plate is disposed to retract to the reverse side of the wheel cap.

As a result, the quantity of air which is sucked through the air suction opening can be enlarged. As a result, the efficiency of cooling the disc wheel and so forth can furthermore be improved.

It is preferable that the center plate projects over the right side of the wheel cap.

Also in the foregoing case, the efficiency of cooling the disc wheel and so forth can furthermore be improved.

Features and advantages of the invention will be evident from the following detailed description of the preferred embodiments described in conjunction with attached drawings.

BRIEF DESCRIPTION OF THE DRAWINGS

In the accompanying drawings:

FIG. 4 is a graph showing results of measurement of the flow rate of air according to experiment 1;

FIG. 15 is a diagram showing the relationship of various positions of air discharge openings and through holes according to experiment 4;

DETAILED DESCRIPTION OF THE PREFERRED EMBODIMENTS

1st Embodiment

A wheel cap according to an embodiment of the present invention will now be described with reference to FIGS. 1 and 2.

Figure 1:
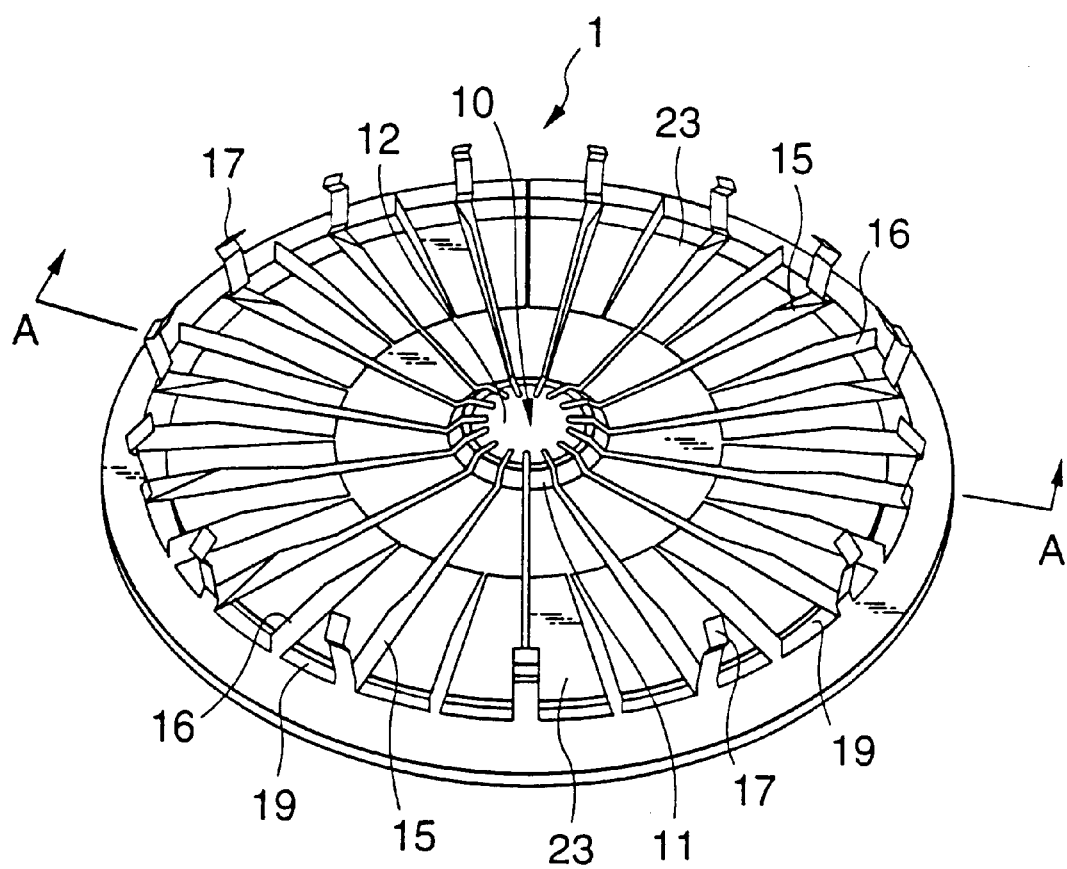
FIG. 1 is a perspective view showing the reverse side of a wheel cap according to a first embodiment.
Figure 2:
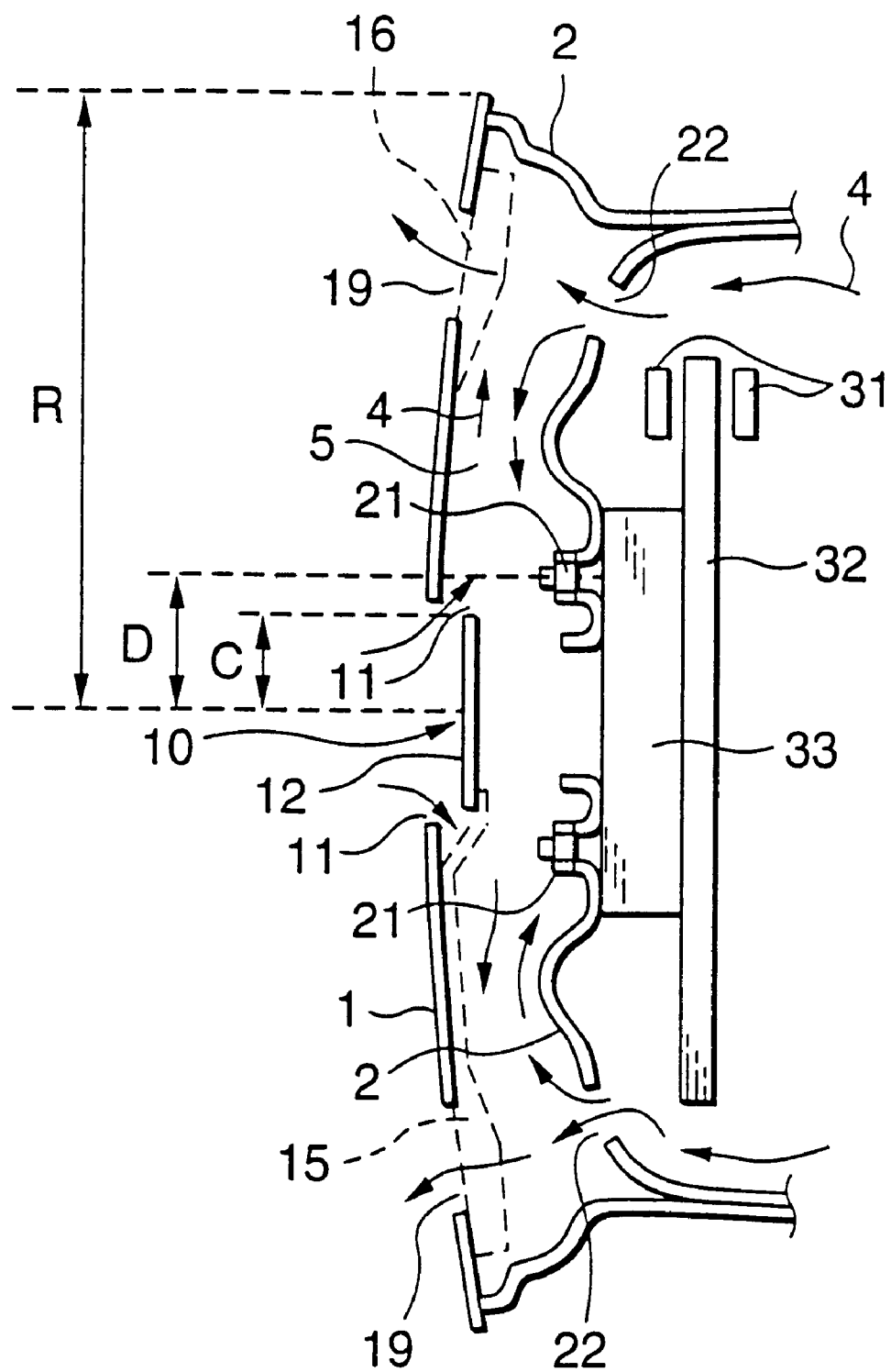
FIG. 2 is a cross sectional view showing a state in which the wheel cap according to the first embodiment has been joined to a disc wheel and taken along line A—A shown in FIG. 1.

As shown in FIGS. 1 and 2, the wheel cap 1 is detachably joined to a disc wheel and structured to have air discharge openings 19 formed in the outer periphery thereof.

As shown in FIGS. 1 and 2, a plurality of rib-like radial fins 15 and 16 formed from a wheel cap center 10 toward the outside are provided for the reverse side of the wheel cap 1.

The height of the outer periphery of each of the fins 15 and 16 is larger than the height in a portion adjacent to the central portion of the wheel cap 1.

The fins 15 and 16 are composed of long fins 15 extending from the center plate 12 to the air discharge openings 19 and short fins 16 extending from an intermediate portion between the air suction opening 11 and the air discharge openings 19 to the air discharge openings 19. The long fins 15 and the short fins 16 are alternately disposed on the overall outer portion of the wheel cap 1. A plurality of conducting paths 23 for conducting air between the wheel cap and the disc wheel are formed between the fins 15 and 16.

The total number of the fins 15 and 16 is 20 to 30.

The wheel cap 1 according to this embodiment has an air suction opening 11 adjacent to a wheel cap center 10. As shown in FIG. 2, the air suction opening 11 is positioned nearer the center of the wheel cap center 10 than a hub nut 21 which secures the disc wheel 2 to an axle hub 33 after the wheel cap 1 has been joined to the disc wheel 2.

Referring to FIG. 1, reference numeral 17 represents a claw for engaging the wheel cap 1 to the disc wheel 2.

The operation of this embodiment will now be described.

After the wheel cap 1 has been joined to the disc wheel 2 as shown in FIG. 2, air 4 is sucked from the inside portion of the disc wheel 2 and the air suction opening 11. Then, air 4 is introduced into the interior space 5 between the wheel cap 1 and the disc wheel 2 through the through holes 22 of the disc wheel 2. Then, air 4 is discharged through the air discharge openings 19.

That is, as indicated with an arrow shown in FIG. 2, air 4 is allowed to pass through a brake pad 31, a brake disc 32, an axle hub 33, the hub nut 21, the disc wheel 2, the wheel cap 1 and so forth.

The effect of the present invention will now be described.

As described above, the reverse side of the wheel cap 1 according to this embodiment is provided with the plural fins 15 and 16 (see FIGS. 1 and 2).

As a result, centrifugal force generated owning to the rotations of the wheel is imparted to air 4 sucked into the interior space 5 so that air 4 is sent to the air discharge openings 19 formed in the outer periphery of the wheel cap 1 along the fins 15 and 16.

That is, the centrifugal force is generated owning to the rotations of air 4 caused by the rotations of the wheel. Since the fins 15 and 16 are provided for the reverse side of the wheel cap 1 as described above, air 4 can efficiently be rotated. Thus, great centrifugal force is imparted to air 4.

Therefore, air 4 in the interior space 5 can efficiently be sent to the air discharge openings 19 along the fins 15 and 16.

Therefore, the quantity of air 4 which is circulated in the interior space 5 can be enlarged. Thus, the efficiency of cooling the disc wheel 2 and so forth can be improved.

The total number of the fins 15 and 16 is 20 to 30.

Therefore, air 4 in the interior space 5 can furthermore efficiently be rotated. As a result, the quantity of air 4 which is circulated can furthermore be enlarged (refer to example 2).

The fins 16 are provided for only the outer portion.

Therefore, circulation of air in the interior space 5 can smoothly be performed (refer to example 1) similarly to the structure in which the fins 16 are provided from the center plate 12 to the air discharge openings 19 similarly to the fins 15. Moreover, the weight of the wheel cap 1 can be reduced.

The air suction opening 11 of the wheel cap 1 is formed near the wheel cap center 10 as compared with the hub nut 21.

Therefore, as indicated with an arrow shown in FIG. 2, air 4 sucked through the air suction opening 11 is able to pass through the region including the hub nut 21. As a result, the hub nut 21 can efficiently be cooled down.

As a result, conduction of heat from the axle hub 33 to the disc wheel 2 through the hub nut 21 can be prevented. As a result, rise in the temperatures of the disc wheel 2 and the wheel cap 1 joined to the disc wheel 2 can efficiently be prevented.

As described above, according to this embodiment, a wheel cap can be obtained which is capable of preventing rise in the temperatures of the disc wheel, the wheel cap and so forth after the wheel cap has been joined to the disc wheel.

Experiment 1

Figures 3A, 3B:
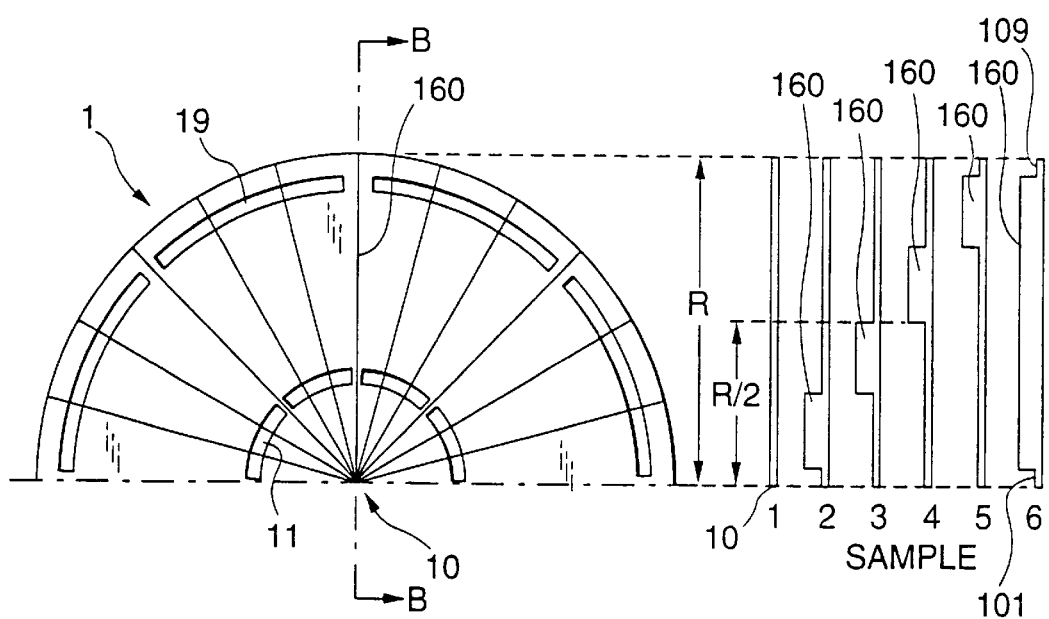
FIG. 3 is a diagram showing fins provided for the wheel cap for use in experiment 1.

In this experiment, change in the flow rate of air in the air suction opening 11 and the through hole of the disc wheel with respect to the positions of the fins in the radial direction of the wheel cap 1 was measured as shown in FIGS. 3A, 3B and 4.

The wheel cap 1 employed in this experiment, as shown in FIG. 3A, incorporates the air suction opening 11 and the air discharge openings 19. The radius R of the wheel cap 1 is 426 mm, while the positions of the air discharge openings 19 are 373 mm to 390 mm from the wheel cap center 10. Moreover, the position of the air suction opening 11 is 125 mm to 138 mm from the wheel cap center 10.

As shown in FIG. 3B, the following samples of the wheel cap 1 were prepared: a sample (sample 1) having no fin; a sample (sample 2) having the fin 160 on the straight line which connected the wheel cap center 10 and the outer periphery to each other at a position of a distance of 20 mm to 65 mm from the wheel cap center; a sample (sample 3) having the fin 160 at a position of a distance from 65 mm to 110 mm; a sample (sample 4) having the fin 160 at a position of a distance from 110 mm to 155 mm; a sample (sample 5) having the fin 160 at a position of a distance from 155 mm to 200 mm; and a sample (sample 6) having the fin 160 at a position of a distance from 20 mm to 200 mm.

Additional samples, similar to samples 1 to 6, but which were not provided with the air suction opening 11 were prepared as samples 11 to 16.

Samples 2 to 6 and samples 12 to 16 of the wheel cap 1 had twenty four fins 160.

The twelve types of the samples were evaluated as follows.

The wheel cap 1 was joined to the disc wheel, and then the wheel was rotated at 1000 rpm. Then, the flow rate of air in the air suction opening 11 and the through hole were measured. Then, evaluation was performed by comparing the total flow rate of air.

Results are shown in FIG. 4.

As can be understood from FIG. 4, sample 6 having the air suction opening 11 generated a largest flow rate of air among the samples each having the air suction opening 11. Sample 16 generated a largest flow rate of air among the samples each having no air suction opening 11.

That is, a sample having the fin 160 in substantially the overall region from the wheel cap center 10 to the outer periphery of the wheel cap generated the largest flow rate of air.

However, each of samples 4 and 5 resulted in a similar flow rate of air to the result of sample 6. On the other hand, each of samples 14 and 15 resulted in a similar flow rate of air to the result of sample 16.

That is, the sample having the fin 160 provided for the half of the outer portion on the straight line which connected the wheel cap center 10 and the outer periphery to each other was free from considerably reduction in the flow rate of air if the fin was not provided for the half portion adjacent to the central portion.

Samples 2 and 3 generated considerably smaller flow rate of air as compared with that of sample 6, the flow rate of air being similar to that of sample 1. Also samples 12 and 13 generated considerably smaller flow rate of air as compared with sample 6, the flow rate of air being similar to that of sample 11.

That is, the effect of the fin 160 provided for the half portion adjacent to the center cannot be obtained in a case where the fin 160 was not provided for the outer half portion on the straight line connecting the wheel cap center 10 and the outer periphery to each other. Thus, the flow rate of air cannot be enlarged.

The foregoing results show that provision of the fin for only the central half of the reverse side of the wheel cap cannot enlarge the flow rate sufficiently. If the fins are provided for only the outer half portion, an effect similar to that obtained in a case where the fins were provided for substantially the overall regions from the center to the outer periphery can be obtained.

Samples 2 to 6 shown in FIG. 3B do not have the fin in a portion 101 adjacent to the center of the wheel cap 1 and an outer portion 109 of the same.

Experiment 2

Figure 5:
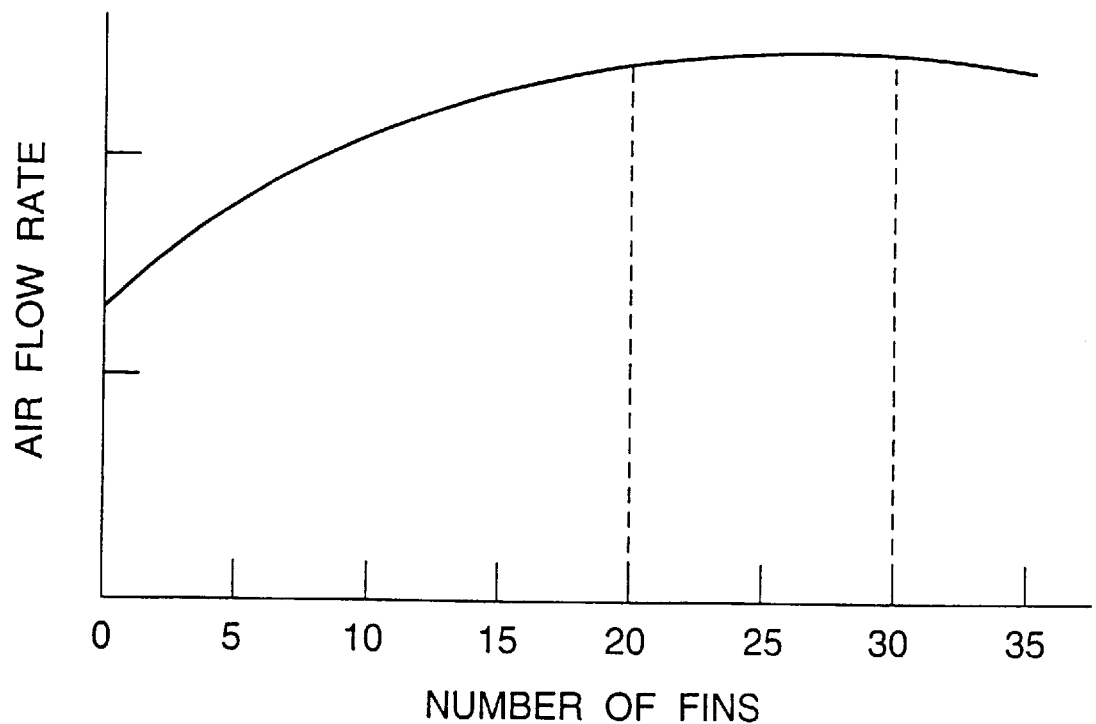
FIG. 5 is graph showing results of measurement of the flow rate of air according to experiment 2.

In this experiment, change in the flow rate of air caused from change in the number of fins provided for the reverse side of the wheel cap was measured, as shown in FIG. 5.

The wheel cap had the same shape as that of sample 6 according to example 1.

The number of the fins of the wheel cap was changed to zero to 35. Each wheel cap was joined to the disc wheel, and then the wheel was rotated at 1000 rpm to measure the flow rate of air.

The flow rate of air was measured at the through hole and the air suction opening to compare the total flow rates of air.

Results of the measurement were shown in FIG. 5.

As can be understood from FIG. 5, the flow rate of air is enlarged as the number of the fins is enlarged when the number of the fins is smaller than 20. If the number of the fins is larger than 20, the flow rate of air cannot be enlarged if the number is further increased. If the number of the fins is larger than 30, the flow rate of air is reduced as the number is increased.

The foregoing results show that the quantity of air which is circulated in the interior space can be increased most efficiently if the number of the fins provided for the reverse side of the wheel cap is 20 to 30.

2nd Embodiment

In this embodiment, the wheel cap 1 has the air discharge openings 19 opened toward outside as shown in FIG. 6.

Figure 6A:
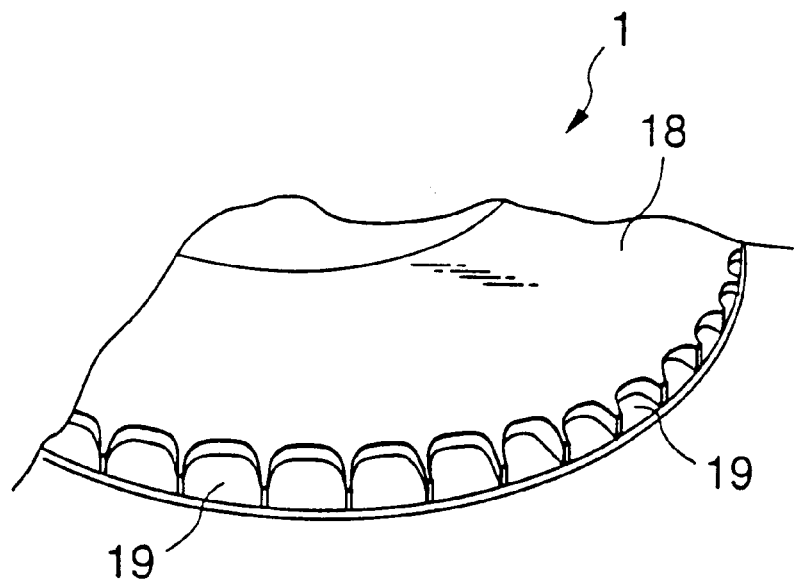
FIG. 6A is a perspective view showing a second embodiment of the wheel cap.

That is, each of the air discharge openings 19 is formed into a cut-out shape formed in the outer end of the wheel cap 1, as shown in FIG. 6A. Therefore, gaps 199 are formed between the air discharge openings 19 formed into the cut-out shape and the end of the disc wheel 2 after the wheel cap 1 has been joined to the disc wheel 2.

The other structures are similar to those according to the first embodiment.

The operation and effect of this embodiment will now be described.

The wheel cap 1 has the air discharge openings 19 formed at the outer end thereof. Therefore, air sucked into the interior space is discharged from the outer end of the wheel cap 1.

Therefore, an excellent air discharge characteristic can be realized and the overall body of the disc wheel 2 and so forth can efficiently be cooled down.

The air discharge openings 19 are formed into the cut-out openings formed at the outer end of the wheel cap 1. That is, the air discharge openings 19 are not the through holes. Therefore, when the wheel cap 1 is molded, portions of molding resin are not made contact with each other.

Therefore, color change portions in the form of stripes can be prevented which have been formed in the outer portion of the conventional wheel cap. As a result, the quality of the appearance does not deteriorate.

Figure 6B:
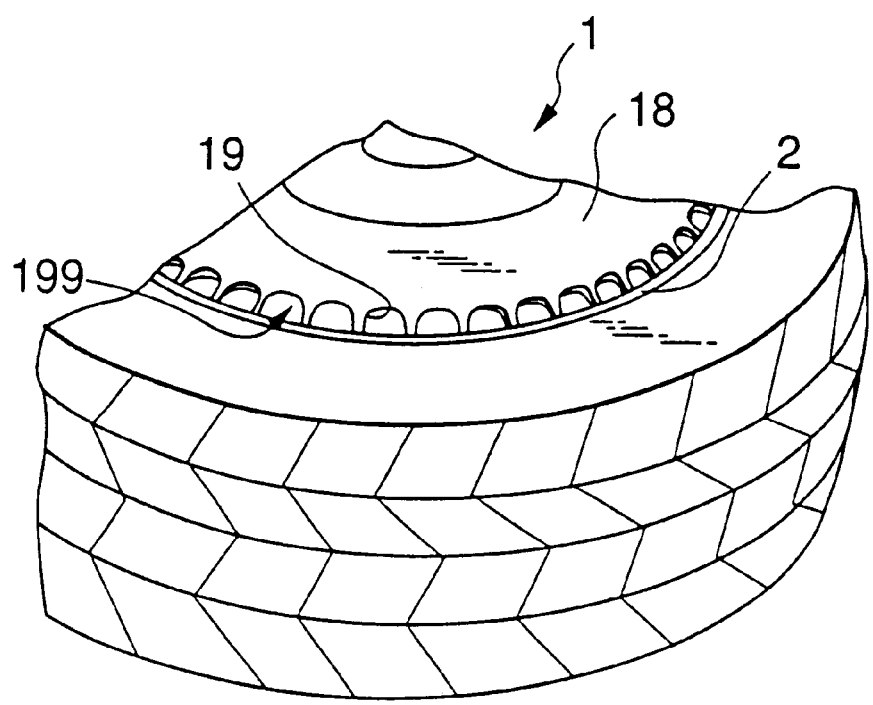
FIG. 6B is a perspective view showing the wheel cap joined to the disc wheel.

Since the wheel cap 1 has the cut-out shape outer end, the gaps 199 are formed from the end of the disc wheel 2 in a state in which the wheel cap 1 has been joined to the disc wheel 2 (see FIG. 6B).

When a tool or the like is inserted into the gap 199, an operation for removing the wheel cap 1 from the disc wheel 2 can easily be performed.

The air discharge openings 19 of the wheel cap 1 are formed into the cut-out shape openings opened toward the outside. Therefore, if dust of brake pad or the like is, together with air, discharged through the air discharge openings 19, dust of the brake pad or the like is not allowed to adhere to a designed surface 18 of the wheel cap 1.

Therefore, a wheel cap which cannot easily be contaminated can be obtained.

Since the designed surface 18 of the wheel cap 1 is not required to have an opening, the designed surface 18 can be flattened. Therefore, an operation for cleaning the wheel cap 1 can easily be performed. Moreover, an excellent cd value indicating resistance of air can be obtained.

As described above, according to this embodiment, a wheel cap can be obtained which is able to prevent a rise in the temperatures of the brake pad, the disc wheel, the wheel cap and so forth after the wheel cap has been joined to the disc wheel and which exhibits an excellent design quality.

Moreover, similar operation and effect to those of the first embodiment can be obtained.

3rd Embodiment

A wheel cap according to this embodiment will now be described with reference to FIGS. 7 to 10. The structure of the reverse side of a wheel cap is same as the first embodiment, and the reverse side view is omitted.

Figure 9:
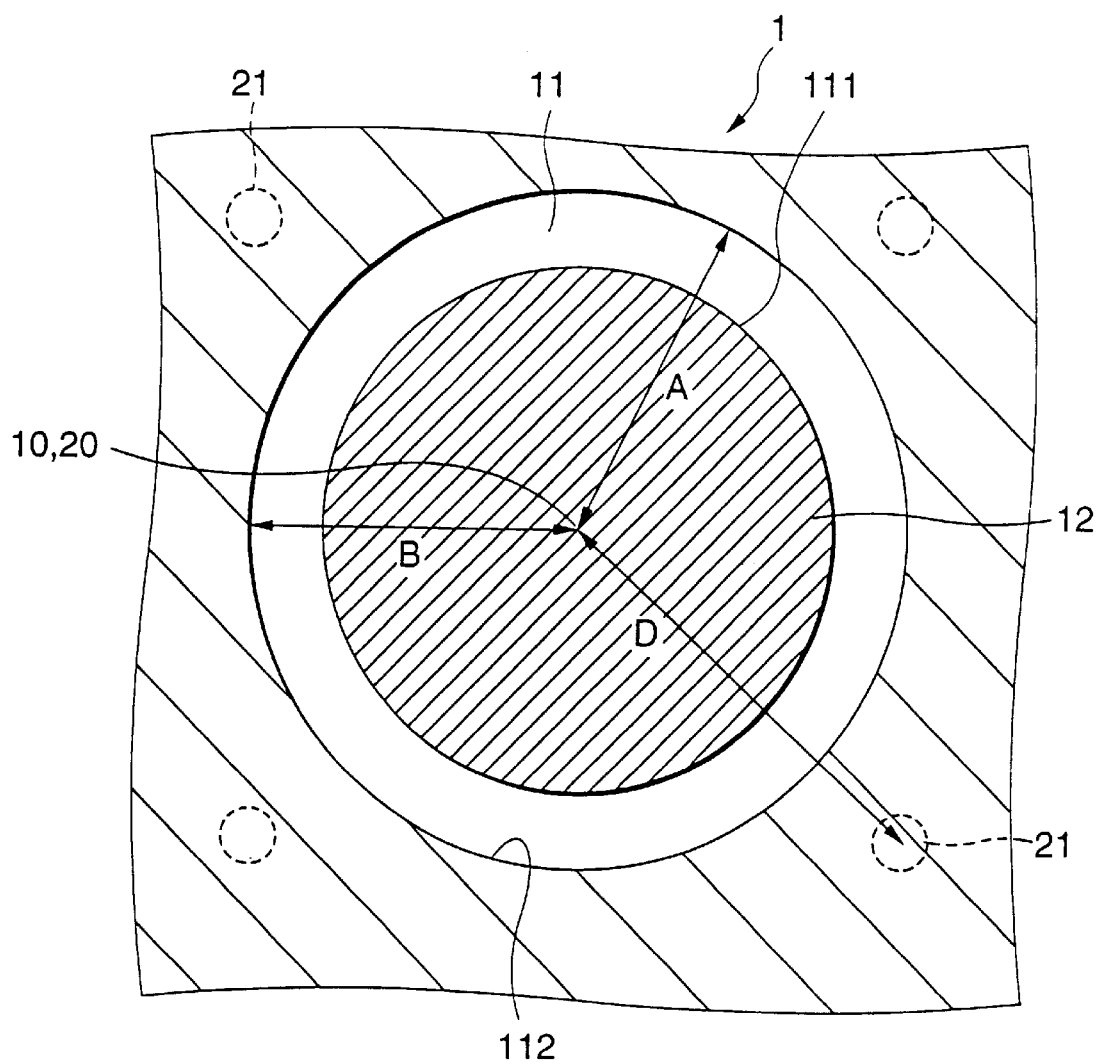
FIG. 9 is a diagram showing the relationship of the positions between an air suction opening and a hub nut according to the third embodiment.

In this embodiment, an inner distance A between the innermost wall 111 of the air suction opening 11 and the wheel cap center 10 is shorter than a securing distance D between a hub nut 21 for securing the disc wheel 2 to the axle hub 33 and the disc wheel center 20 (see FIG. 9).

Also a distance B between the outermost wall 112 of the air suction opening 11 and the wheel cap center 10 is shorter than the securing distance D (see FIG. 9).

Figure 7:
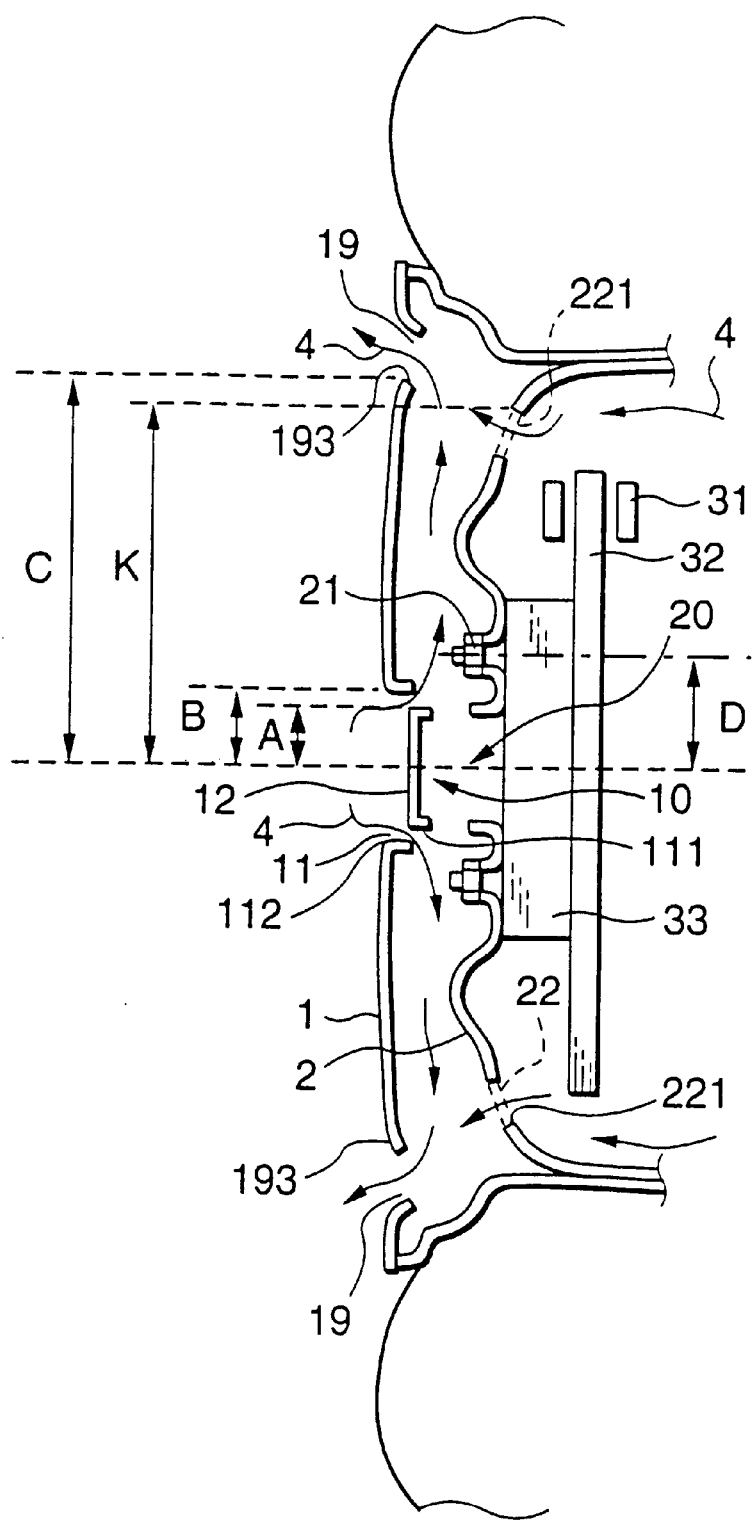
FIG. 7 is a cross sectional view showing a state in which a wheel cap according to a third embodiment has been joined to a disc wheel.
Figure 8:
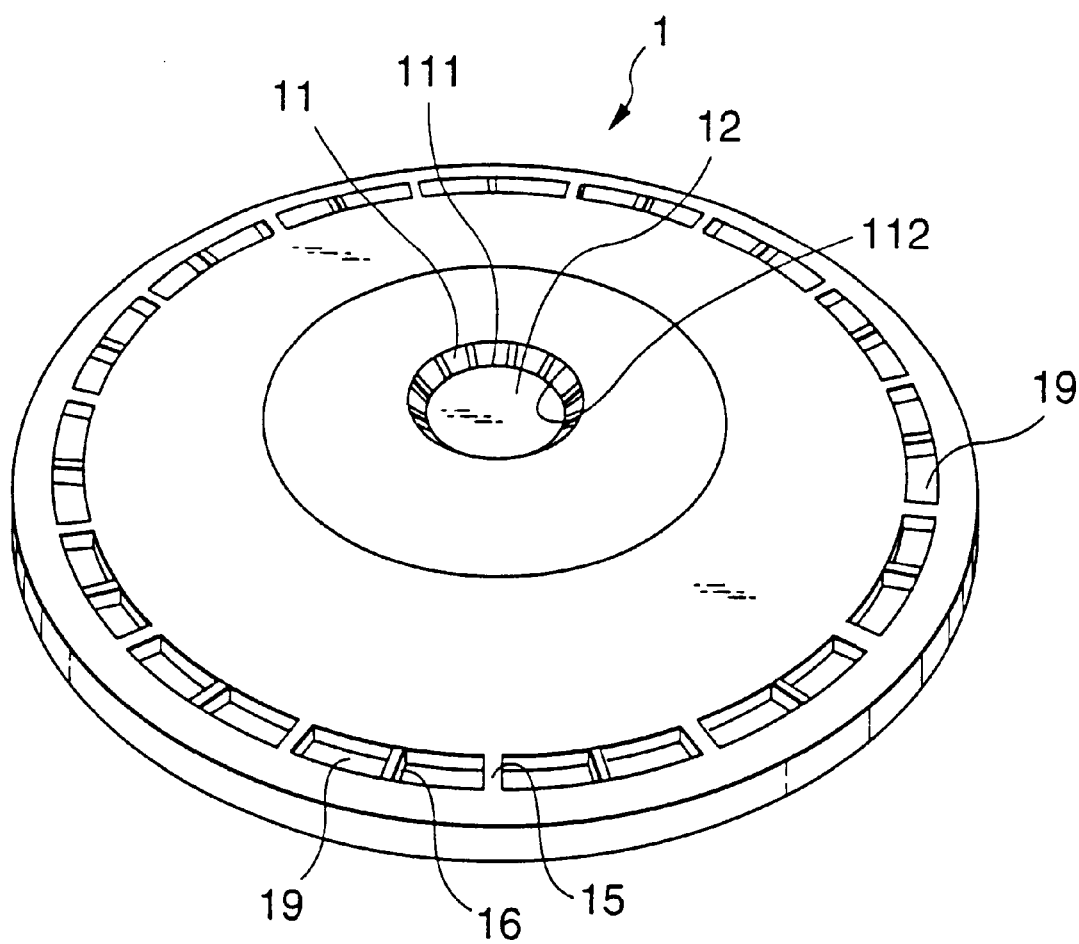
FIG. 8 is a perspective view showing the right side of the wheel cap according to the third embodiment.
Figure 10:
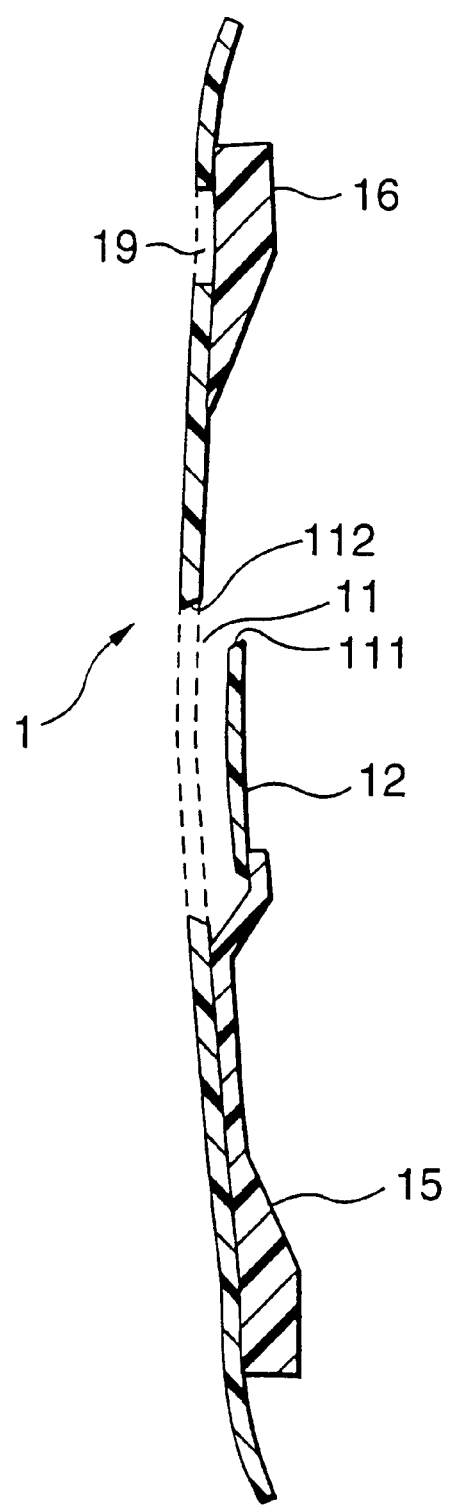
FIG. 10 is a cross sectional view of the wheel cap taken along line A—A shown in FIG. 1.

The center plate 12 is disposed to retract to the reverse side of the wheel cap (see FIGS. 7, 8, and 10).

Similarly to the first embodiment, the reverse side of the wheel cap 1 has a plurality of fins 15 and 16 formed radially from the center of the reverse side of the wheel cap 1 toward the outside.

A discharge opening distance C between central side walls 193 of the air discharge openings 19 and the wheel cap center 10 is longer than a through-hole distance K between the outermost wall 221 of each through hole 22 provided for the disc wheel 2 and the disc wheel center 20 (see FIG. 7).

After the wheel cap 1 has been joined to the disc wheel 2, the air discharge openings 19 are disposed further to the outside of the disc wheel 2 than the through holes 22.

The operation and effect of the wheel cap 1 according to this embodiment will now be described.

After the wheel cap 1 has been joined to the disc wheel 2, the air suction opening 11 are positioned adjacent to the disc wheel center 20 as compared with the hub nut 21 (see FIGS. 7 and 9). Therefore, air 4 is, as indicated with an arrow shown in FIG. 7, introduced into the disc wheel 2 and the wheel cap 1 through a position closer to the disc wheel center 20 than the hub nut 21 so as to be discharged through the air discharge openings 19.

Therefore, air 4 is allowed to pass through the center portions of the hub nut 21, a brake disc 32, an axle hub 33 and the disc wheel 2.

Therefore, the central portions of the brake disc 32, the axle hub 33 and the disc wheel 2 and the hub nut 21 can sufficiently be cooled down.

The center plate 12 is disposed to retract to the reverse side of the wheel cap 1. Therefore, air 4 in a large quantity can be sucked through the air suction opening 11.

Further, the plural fins 15 and 16 are provided for the reverse side of the wheel cap 1 as similar to the first embodiment. Therefore, greater centrifugal force is imparted to air 4 sucked through the air suction opening 11. Thus, air 4 can efficiently be sent to the air discharge openings 19 along the fins 15 and 16.

Therefore, the brake disc 32, the axle hub 33 and the disc wheel 2 can be cooled down at an excellent efficiency.

As a result, rise in the temperatures of the central portions of the brake disc 32, the axle hub 33 and the disc wheel 2 can be prevented.

Similarly to the first embodiment, since the hub nut 21 can sufficiently be cooled down, conduction of heat from the brake disc 32 and the axle hub 33 to the disc wheel 2 can be prevented. As a result, rise in the temperatures of the disc wheel 2 and the wheel cap 1 can be prevented.

Similarly to the first embodiment, air 4 is also sucked from the reverse side of the disc wheel 2, as shown in FIG. 7. Then, air is allowed to pass through the brake pad 31 and the through holes 22 of the disc wheel 2, and then air 4 is discharged through the air discharge openings 19 of the wheel cap 1.

Therefore, rise in the temperature of the brake pad 31 can be prevented.

The air discharge openings 19 are disposed adjacent to the outer periphery of the disc wheel 2 as compared with the through holes 22 (see FIG. 7).

Therefore, centrifugal force generated when the wheel has been rotated is exerted on air 4 allowed to pass through the through holes in the direction of the air discharge openings 19.

As a result, the quantity of air which is circulated in the wheel cap 1 can be increased. Thus, the efficiency of cooling the disc wheel 2 and so forth can furthermore be improved.

Experiment 3

As shown in FIGS. 6A, 6B and 7, in this experiment, change in the flow rate of discharged air was confirmed. The increased flow rate occurred due to the relationship between the discharge port distance C between the innermost wall of the air discharge opening of the wheel cap and the center of the wheel cap and the through-hole distance K between the outermost wall of each through hole provided for the disc wheel and the center of the disc wheel.

Figure 11A:
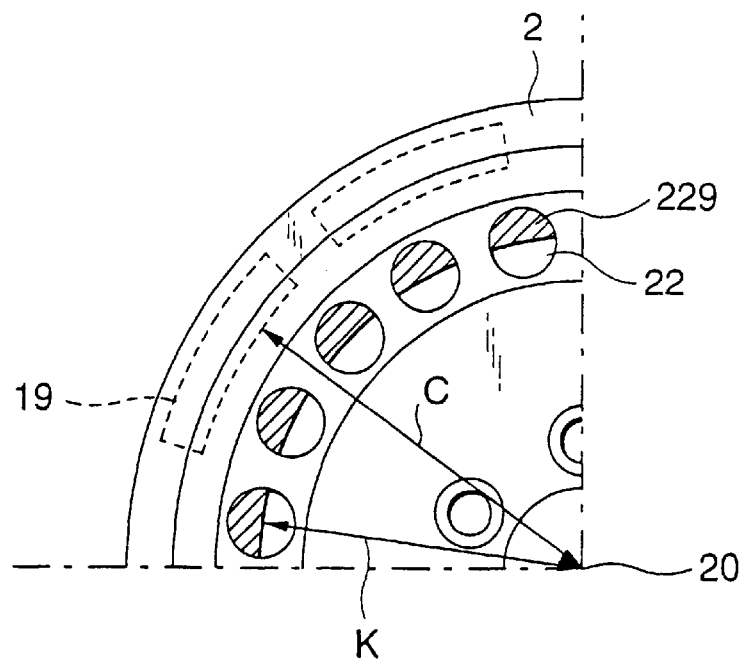
FIG. 11A is a diagram showing a disc wheel for use in sample 1 of experiment 3.
Figure 11B:
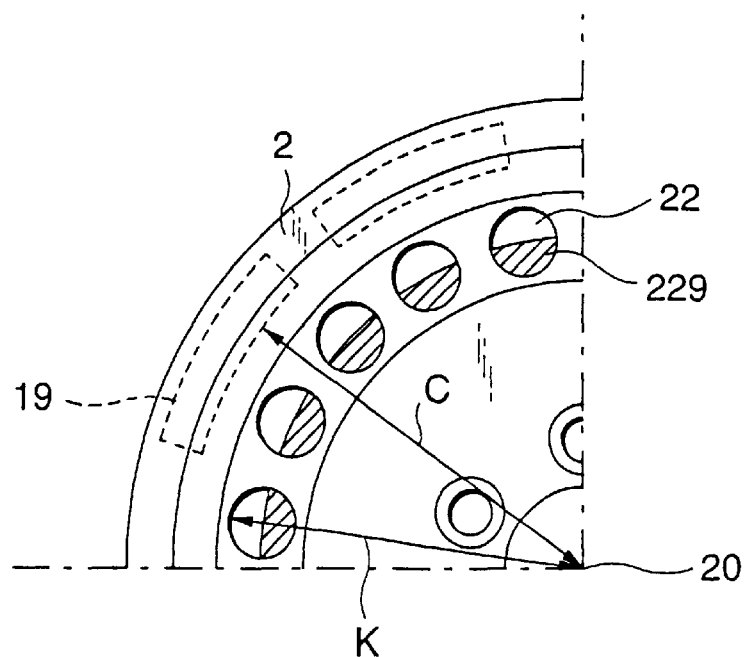
FIG. 11B is a diagram showing a disc wheel for use in sample 2 of experiment 3.

The disc wheel 2 to which the wheel cap 1 according to the third embodiment was joined was tested. A sample (sample 1) of the disc wheel 2 having an outer half portion of each through hole 22 of the disc wheel 2 which was closed with a closing members 229 as shown in FIG. 11A was prepared. Moreover, a sample (sample 2) was prepared which had a central half portion of each of the through holes 22 which was closed as shown in FIG. 11B.

The wheel samples 1 and 2 were rotated at 1000 rpm to measure the flow rate of air at the air discharge opening.

Figure 12:
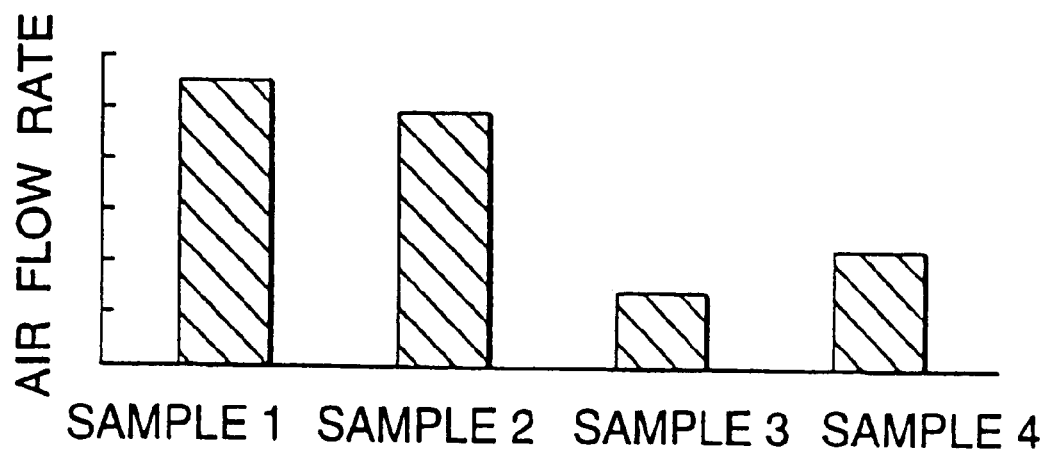
FIG. 12 is a graph showing results of measurement of air flow at the air discharge opening according to experiment 3.

Results were shown FIG. 12.

As can be understood from FIG. 12, the sample (sample 1) having the through holes 22, the outer half portions of which were closed, generated greater flow rate of air at the air discharge openings 19 as compared with the sample (sample 2) having the through holes 22, the central half portions of which were closed.

To make a comparison, samples 3 and 4 obtained by removing the wheel cap 1 of the samples 1 and 2 were prepared to perform similar tests.

In the foregoing case, as shown in FIG. 12, the sample (sample 4) incorporating the through holes 22 which had the central half portions which were closed generated greater flow rate of air compared to the samples (sample 3) incorporating the through holes 22 which had the closed outer half portions.

The foregoing results shows that the quantity of air which is discharged through the air discharge openings 19 is increased in proportion to the discharge opening distance C with respect to the through hole distance K after the wheel cap 1 has been joined to the disc wheel 2.

4th Embodiment

Figure 13:
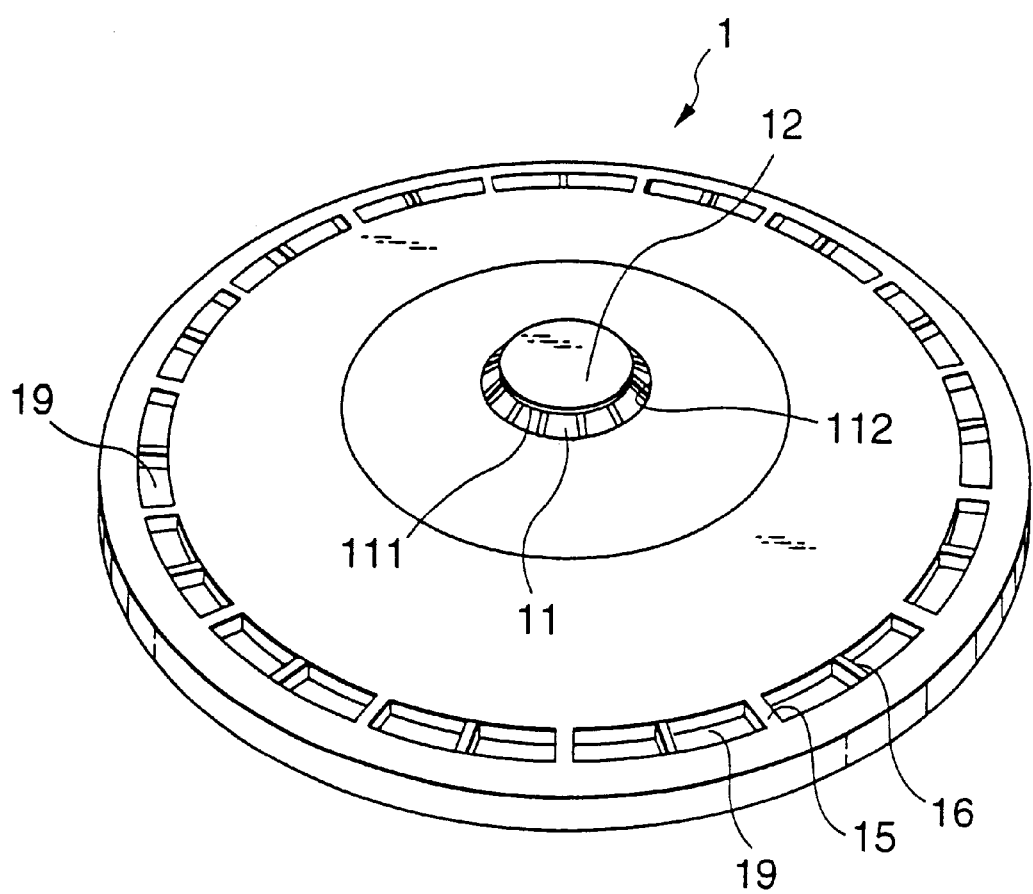
FIG. 13 is a perspective view showing a fourth embodiment of the wheel cap.

In this embodiment, the center plate 12 projects to the right side of the wheel cap 1, as shown in FIG. 13. The other structures are similar to those according to the third embodiment.

Also in this embodiment, a wheel cap can be obtained with which great quantity of air can be sucked through the air suction opening 11 and in which the disc wheel 2 and so forth can be cooled down at a satisfactory efficiency. Moreover, a similar effect to that obtainable from the third embodiment can be obtained.

5th Embodiment

Figure 14:
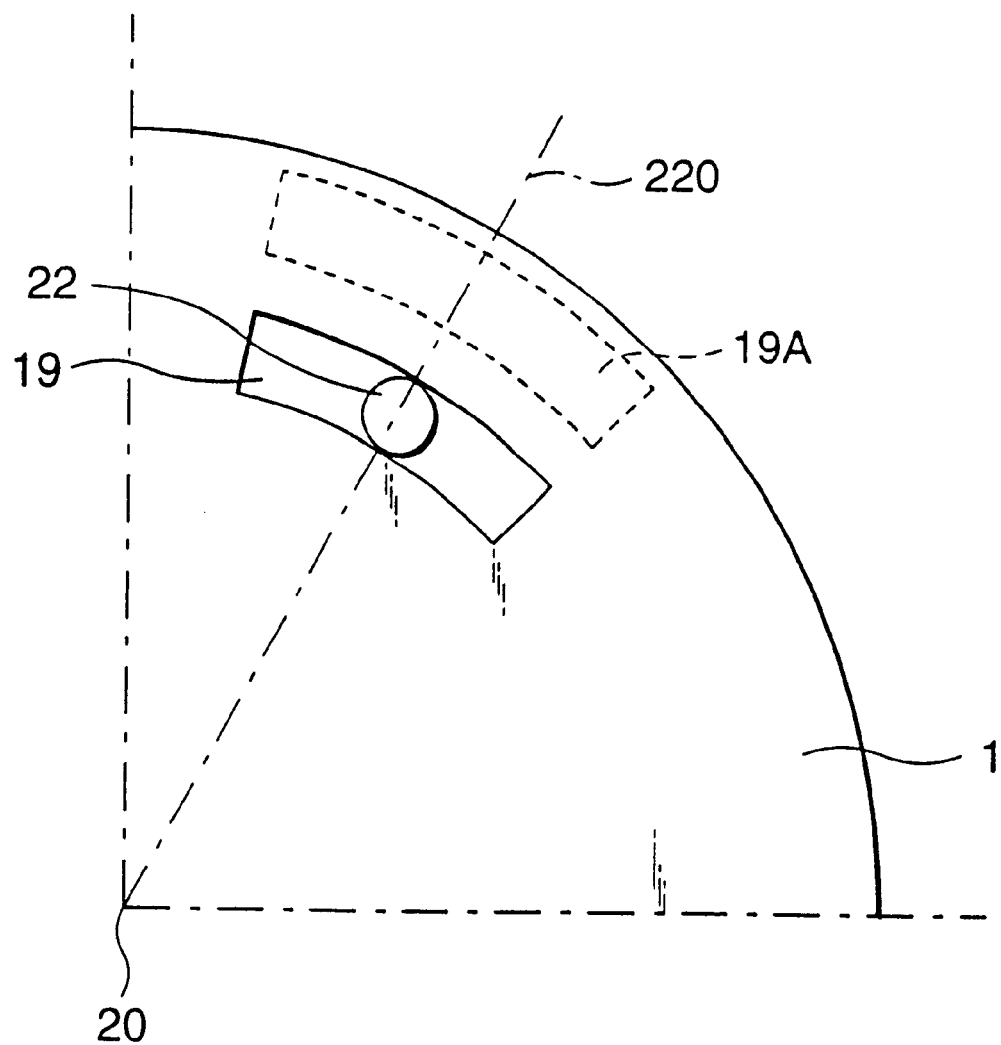
FIG. 14 is a diagram showing the relationship of positions of air discharge openings of the wheel cap according to a fifth embodiment and through holes of the same.

As shown in FIG. 14, the wheel cap 1 according to this embodiment has each of the air discharge openings 19 formed on a straight line 220 which connects each of the through holes 22 of the disc wheel and the disc wheel center 20 to each other.

When the wheel cap 1 joined to the disc wheel is viewed from the front portion, the air discharge openings are sometimes positioned at the same positions of the through holes 22 as indicated with reference numeral 19 shown in FIG. 14. The air discharge openings are sometimes positioned outer than the through holes 22 as indicated with reference numeral 19A. The wheel cap according to the aforementioned embodiments has the air discharge openings 19A. However, a wheel cap having air discharge openings 19 positioned at the same positions of the through holes 22 is adopted for the convenience of the explanation in the present embodiment. Of course, the present embodiment can be adapted to the wheel cap having air discharge openings 19A positioned outer than the through holes 22.

The other structures are similar to those according to the third embodiment.

The operation and effect of this embodiment will now be described.

After the wheel cap 1 has been joined to the disc wheel 2, air 4 allowed to pass through the through holes 22 from the inside portion of the disc wheel 2 is discharged through the air discharge openings 19 of the wheel cap 1 (see FIG. 7). At this time, the air discharge openings 19 are positioned on the straight lines connecting the through holes 22 and the disc wheel center 20 to one another. Therefore, air allowed to pass through the through holes 22 can smoothly be discharged through the air discharge openings 19.

Therefore, the quantity of air which is circulated in the wheel cap 1 can be enlarged. Thus, the efficiency of cooling the disc wheel and so forth can be improved.

Thus, according to this embodiment, a wheel cap can be obtained which is able to efficiently cool the disc wheel and so forth after the wheel cap has been joined to the disc wheel.

Moreover, operations and effects obtainable from the third embodiment can be obtained.

Experiment 4

Figure 16:
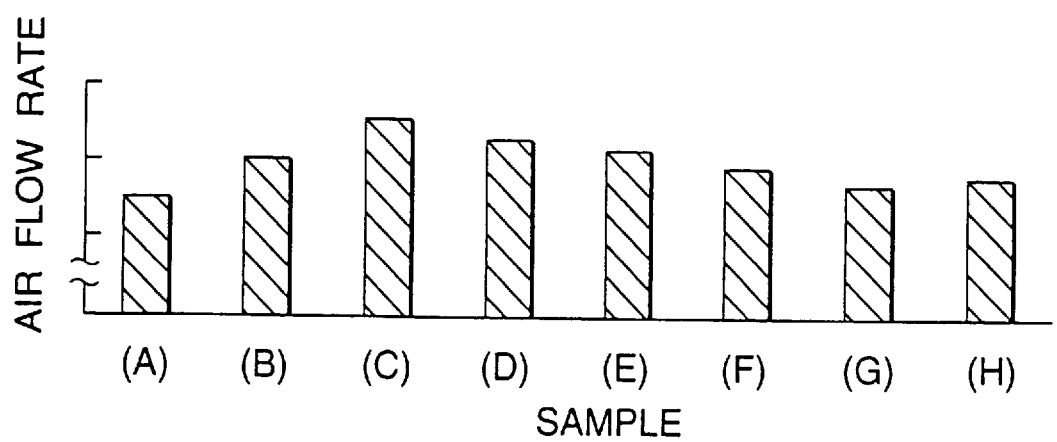
FIG. 16 is a graph showing results of measurement of the flow rate of air in the air discharge opening according to experiment 4.

In this experiment, as shown in FIGS. 15 and 16, the relationship between the circular-arc air discharge openings 19 of the wheel cap 1 and the through holes 22 of the disc wheel in the direction of the rotation of the wheel (indicated with an arrow Y) was changed to measure change in the flow rate of discharged air.

As shown in FIG. 15, the center of the through hole 22 was varied to (A) the same position as that of a front wall 191 of the air discharge opening 19; (B) an intermediate position from the front wall 191; (C) the same position as the center; (D) an intermediate position from a rear wall 192; (E) the same position as that the rear wall 192; (F) in the rear of the rear wall 192; (G) more rearward than (F); and (H) more rearward than (G).

The eight types of samples were rotated at 1000 rpm which was the number of revolutions of the wheel so that the flow rate of air in the air discharge opening 19 was measured.

Results were shown in FIG. 16.

Referring to FIG. 16, results (A) to (H) corresponded to positions (A) to (H) shown in FIG. 15.

As can be understood from FIG. 16, sample (C) generated a greatest flow rate of air. That is, when the center of the air discharge opening 19 was positioned on the straight line which connected the through hole 22 and the disc wheel center 20 to each other as shown (C) in FIG. 15, the greatest quantity of air was discharged.

6th Embodiment

The wheel cap 1 according to this embodiment has a structure that the side wall 193 of each of the air discharge openings 19 adjacent to the center of the wheel cap 1 is not provided with a discharge port fin 195 projecting over the reverse side of the wheel cap 1.

The discharge port fin 195 is a plate projecting over the reverse side of the wheel cap 1 to surround the opening of each of the air discharge openings 19. The discharge port fins 195 guide air flow in the air discharge openings 19.

Figure 17A:
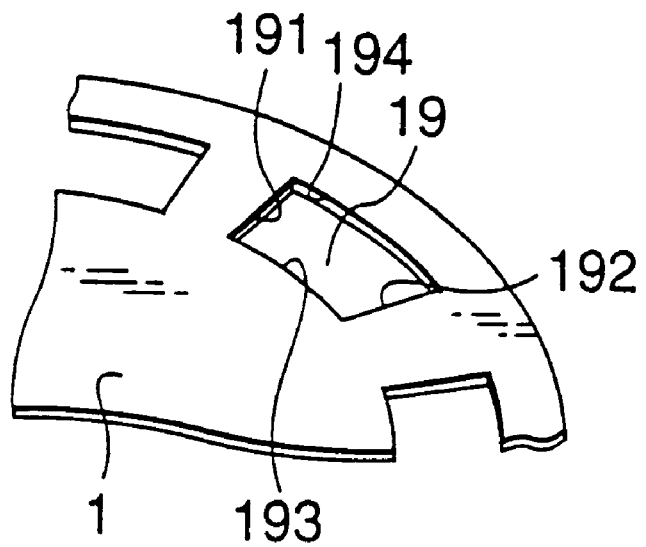
FIG. 17A is a partial perspective view showing a sixth embodiment of the wheel cap having no discharge-port fin.

The structure in which the discharge port fin 195 is not provided for the side wall 193 of the air discharge opening 19 adjacent to the center of the wheel cap 1 may be structured as shown in FIG. 17A in which the discharge port fin is not provided for the surfaces of the air discharge opening 19. In this case, the air discharge opening 19 is a simple opening formed in a flat portion of the wheel cap 1.

Figure 17B:
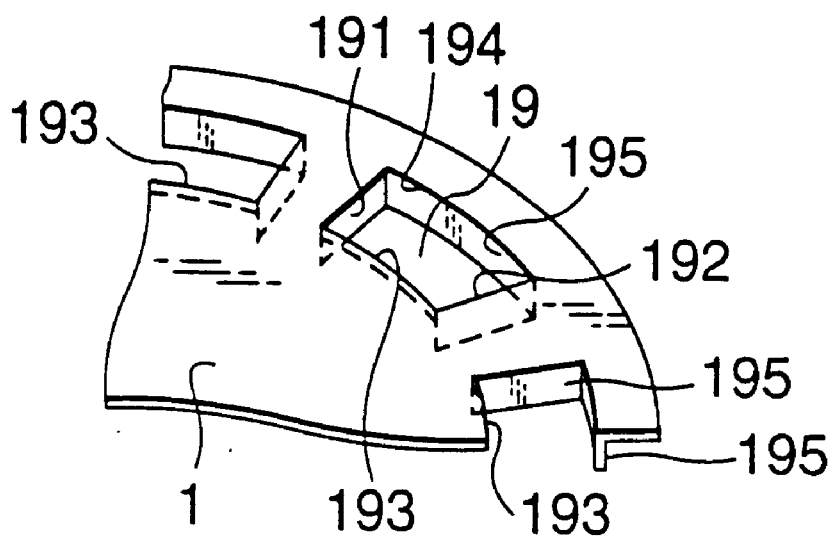
FIG. 17B is a partial perspective view showing the wheel cap having the discharge-port fins provided for three sides of the air discharge opening except for the side of the same adjacent to the center.
Figure 18A:
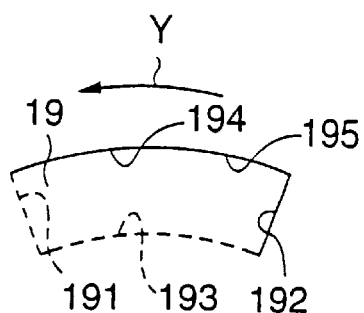
FIG. 18 is a diagram showing air discharge openings according to experiment 5 having discharge-port fins disposed at various positions.
Figure 18B:
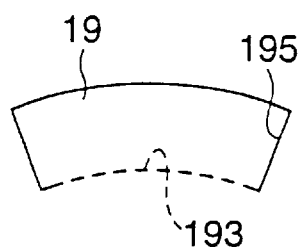
Figure 18C:
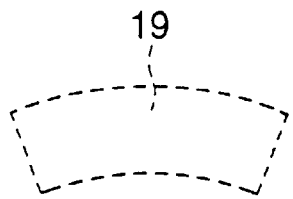
Figure 18D:
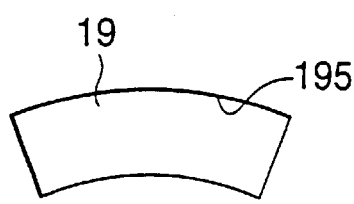
Figure 18E:
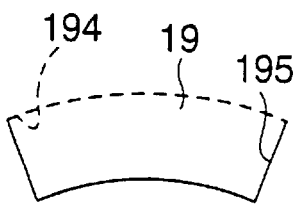
Figure 18F:
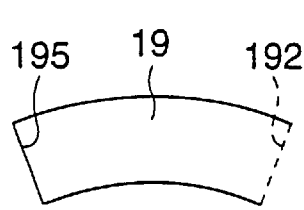

As an alternative to this, the structure shown in FIG. 17B may be employed in which the discharge port fins 195 are provided for only three sides of air discharge opening 19 of the wheel cap 1 except for the side wall 193 adjacent to the center of the wheel cap 1. The other structures are similar to those according to the third embodiment.

The operation and effect of this embodiment will now be described.

After the wheel cap 1 has been joined to the disc wheel 2, the centrifugal force of the disc wheel 2 causes air 4 to flow from the center of the disc wheel 2 to the outside (see FIG. 7). Since the discharge port fin 195 is not provided for the side wall 193 of the air discharge opening 19 adjacent to the center of the wheel cap 1, the flow of air 4 is not obstructed. Thus, air 4 is able to smoothly flow to the air discharge openings 19 so as to be discharged.

Therefore, the quantity of air which is circulated in the wheel cap 1 can be enlarged. Thus, the efficiency of cooling the disc wheel and so forth can be improved.

As described above, according to this embodiment, a wheel cap can be obtained which is able to efficiently cool the disc wheel and so forth after the wheel cap has been joined to the disc wheel.

Moreover, an effect similar to that obtainable from the third embodiment can be obtained.

Experiment 5

Figure 19:
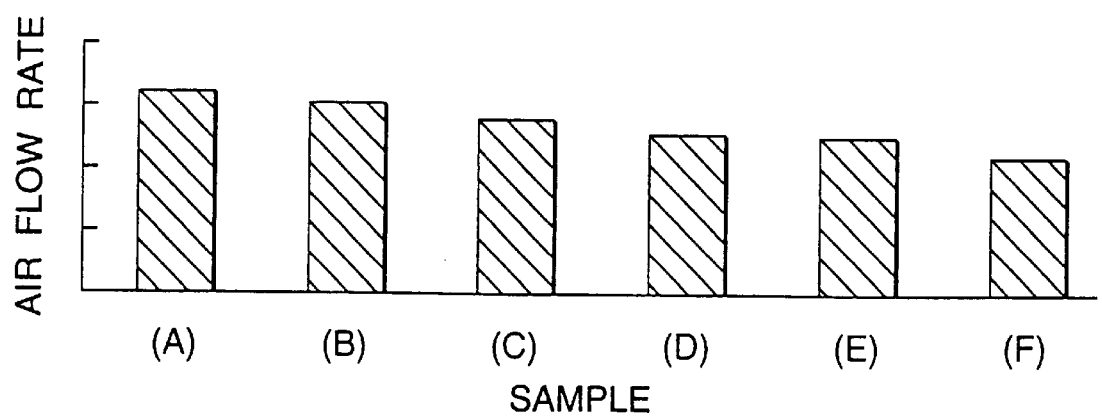
FIG. 19 is a graph showing results of measurement of the flow rate of air at the air discharge opening according to experiment 5.
Figure 20:
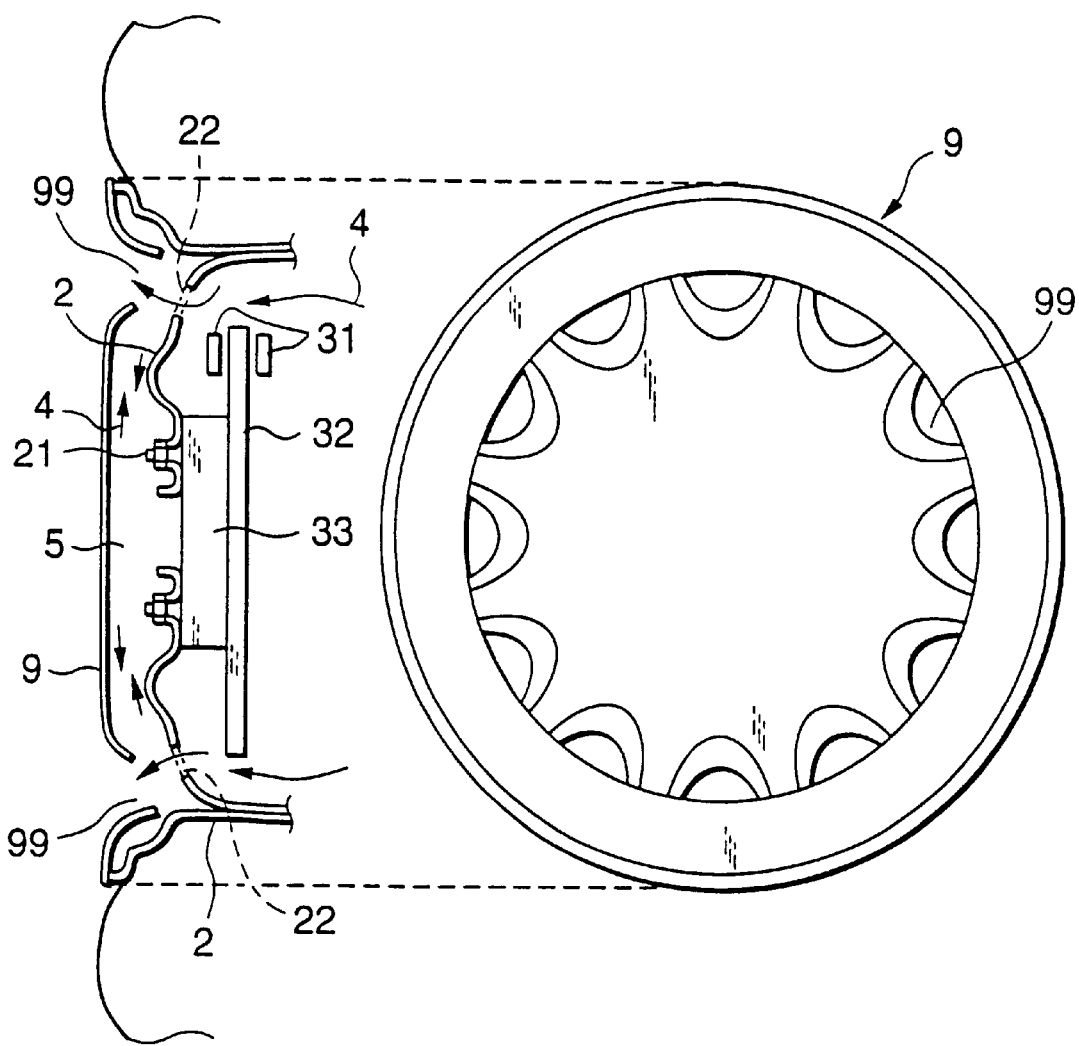
FIG. 20 is a cross sectional view showing a conventional wheel cap joined to the disc wheel and a reverse view showing the conventional wheel cap.

In this experiment, the positions of the discharge port fins 195 according to the sixth embodiment were shifted variously to compare change in the flow rate of air which was discharged through the air discharge openings 19, as shown in FIGS. 18 and 19.

As shown in FIG. 18, comparisons of the positions of the discharge port fins 195 of the air discharge opening 19 were made among the following cases in which the discharge port fins 195 were provided for (A) an outer wall 194 and a rear wall 192; (B) three sides except for the central side wall 193; (C) a case in which the discharge port fin 195 was not provided; (D) all sides; (E) the three sides except for the outer wall 194; and (F) the three sides except for the rear wall 192.

The "outer side" and "adjacent to the center" are outer side of the air discharge opening 19 and the position adjacent to the center of the wheel cap. The "front" and "rear" are front and rear positions with respect to the direction (direction Y shown in (A) in FIG. 18) of rotations of the wheel.

The evaluation method was similar to experiment 4 in which the six types of the samples were rotated at 1000 rpm which was the number of revolutions of the wheel to measure the flow rate at the air discharge opening 19.

Results were shown in FIG. 19.

Referring to FIG. 19, results (A) to (F) corresponded to the samples (A) to (F).

As can be understood from FIG. 19, samples (A), (B) and (C) generated greater air flow as compared with samples (D), (E) and (F).

Samples (A), (B) and (C) shown in FIG. 18 incorporated the air discharge opening 19 which was not provided with the discharge port fin 195 adjacent to the center of the wheel cap 1. The foregoing samples generated greater discharge quantity of air as compared with samples (D), (E) and (F) shown in FIG. 18 each of which incorporated the discharge port fin 195 adjacent to the center of the wheel cap 1.

Among the samples having the central side wall 193 which was not provided with the discharge port fin 195, the sample having the discharge port fins 195 provided for the outer wall 194 and the rear wall 192 as shown in (A) in FIG. 118 enabled a large quantity of air to be discharged (see (A) in FIG. 19).

As described above, according to the present invention, the wheel cap can be provided which is able to prevent a rise in the temperatures of the brake pad, the disc wheel and the wheel cap after the wheel cap has been joined to the disc wheel. Although the invention has been described in its preferred embodiments with a certain degree of particularity, it is understood that the present disclosure of the preferred embodiments can be changed in the details of construction and in the combination and arrangement of parts without departing from the spirit and the scope of the invention as hereinafter claimed.

What is claimed is:

1. A wheel cap detachably connectable to a disc wheel, comprising:

a wheel cap body;

air discharge openings formed in an outer periphery of said wheel cap body;

an annular air suction opening disposed in a central region of the wheel cap such that, when the wheel cap is attached to the disc wheel, air circulates to cool fasteners by which the disc wheel is attached to an axle hub; and a plurality of radial fins provided on a reverse side of said wheel cap body and formed from a center of said wheel cap body and extending radially outwardly, wherein when a radius of said wheel cap body is R, said plurality of radial fins are formed along straight lines which connect the center of said wheel cap body to an outer end of said wheel cap body, in regions from positions of distance R/2 from the center of said wheel cap body to the outer end of said wheel cap body.

2. A wheel cap detachably connectable to a disc wheel, comprising:

a wheel cap body;

air discharge openings formed in an outer periphery of said wheel cap body;

an annular air suction opening disposed in a central region of the wheel cap such that, when the wheel cap is attached to the disc wheel, air circulates to cool fasteners by which the disc wheel is attached to an axle hub; and a plurality of radial fins provided on a reverse side of said wheel cap body and formed from a center of said wheel cap body and extending radially outwardly, wherein when a radius of said wheel cap body is R, said plurality of radial fins are formed along straight lines which connect said center of said wheel cap body to an outer end of said wheel cap body, in regions from positions of distance 3R/4 from the center of said wheel cap body to the outer end of said wheel cap body, said plurality of radial fins being continuously formed in a radial direction.

3. A wheel cap according to claim 1, wherein, when a radius of said wheel cap body is R, said plural fins are formed along straight lines which connect said center of said wheel cap body to an outer end of said wheel cap body, in regions from positions of distance R/2 from the center of said wheel cap body to positions of distance 3R/4.

4. A wheel cap according to claim 1, wherein number of said fins provided on said wheel cap body is 20 to 30.

5. A wheel cap according to claim 1, wherein, when a radius of said wheel cap body is R, said plural fins are formed along a line extending from the center of the wheel cap body to an outer portion of said wheel cap body except for a portion adjacent to the center of said wheel cap body in which a distance from the center of said wheel cap body is R/20 to R/10 and an outer portion in which the distance from the center of said wheel cap body is 9R/10 to 19R/20.

6. A wheel cap detachably connectable to a disc wheel, comprising:

a wheel cap body;

air discharge openings formed in an outer periphery of said wheel cap body;

an annular air suction opening; and a center plate disposed more adjacent to a center of said wheel cap body as compared with said air suction opening, wherein a radial distance between an innermost wall of said air suction opening and the center of said wheel cap body is shorter than a radial distance between a most inside portion of a securing position at which the disc wheel is to be secured to an axle hub and the center of said wheel cap body.

7. A wheel cap according to claim 6, wherein a radial distance between an outermost wall of said air suction opening and the center of said wheel cap body is shorter than the radial distance between the securing position and the center of the wheel cap body.

8. A wheel cap according to claim 6, wherein said center plate is disposed in a position depressed relative to adjacent portions of the wheel cap body.

9. A wheel cap according to claim 6, wherein said center plate is disposed in a position raised relative to adjacent portions of the wheel cap body.

10. A wheel cap according to claim 6, further comprising a plurality of fins formed radially from the center of said wheel cap body and extending radially outwardly on a reverse side of said wheel cap body.

11. A wheel cap detachably connectable to a disc wheel, comprising:

a wheel cap body;

air discharge openings formed in an outer periphery of said wheel cap body;

an annular air suction opening disposed in a central region of the wheel cap such that, when the wheel cap is attached to the disc wheel, air circulates to cool fasteners by which the disc wheel is attached to an axle hub; and a plurality of radial fins provided on a reverse side of said wheel cap body and formed from a center of said wheel cap body and extending radially outwardly, wherein when a radius of said wheel cap body is R, said plural fins are formed along a line extending from the center of the wheel cap body to an outer portion of said wheel cap body except for a portion adjacent to the center of said wheel cap body in which a distance from the center of said wheel cap body is R/20 to R/10 and an outer portion in which the distance from the center of said wheel cap body is 9R/10 to 19R/20.

* * * * *